United States Patent
Kinoshita et al.

[11] Patent Number: 5,448,377
[45] Date of Patent: Sep. 5, 1995

[54] FILM IMAGE EDITING APPARATUS USING IMAGE DENSITY VARIATION DETECTION

[75] Inventors: Katsuyoshi Kinoshita; Kenichiro Hiramoto; Yoshinobu Katae; Takashi Tsutsumi; Kenzo Nakanishi, all of Hachioji, Japan

[73] Assignee: Konica Corporation, Tokyo, Japan

[21] Appl. No.: 152,674

[22] Filed: Nov. 15, 1993

[30] Foreign Application Priority Data

Nov. 30, 1992 [JP] Japan .................... 4-320834
Dec. 14, 1992 [JP] Japan .................... 4-332857

[51] Int. Cl.$^6$ ................. H04N 1/387; H04N 1/40
[52] U.S. Cl. ............................ 358/452; 358/449
[58] Field of Search .......... 358/506, 527, 487, 488, 358/451, 449, 464; 355/38, 41; 353/25, 26 R, 26 A, 27 R, 27 A; 352/79, 80, 129; 354/75, 76

[56] References Cited

U.S. PATENT DOCUMENTS

| | | | |
|---|---|---|---|
| 4,167,678 | 9/1979 | Mischo | 250/559 |
| 4,364,084 | 12/1982 | Akimoto | 358/506 |
| 4,827,526 | 5/1989 | Matsumoto | 382/1 |
| 5,166,786 | 11/1992 | Sakai | 358/527 |
| 5,251,023 | 10/1993 | Arimoto | 358/527 |

FOREIGN PATENT DOCUMENTS 04289841 10/1994 Japan .

*Primary Examiner*—Edward L. Coles, Sr.
*Assistant Examiner*—Allan A. Esposo
*Attorney, Agent, or Firm*—Frishauf, Holtz, Goodman, Langer & Chick

[57] ABSTRACT

A film image editor for editing plural photographic film images. The editor includes: a scanner for reading images in any one of a plurality of different picture sizes from a developed photographic film; a picture size detecting circuit for detecting a picture size of each of the images based on a density variation information of each of the images; an editing interface for editing the image in the detected picture size according to an input operation by an operator; and an output device for outputting the image which is edited by the editing interface.

15 Claims, 27 Drawing Sheets

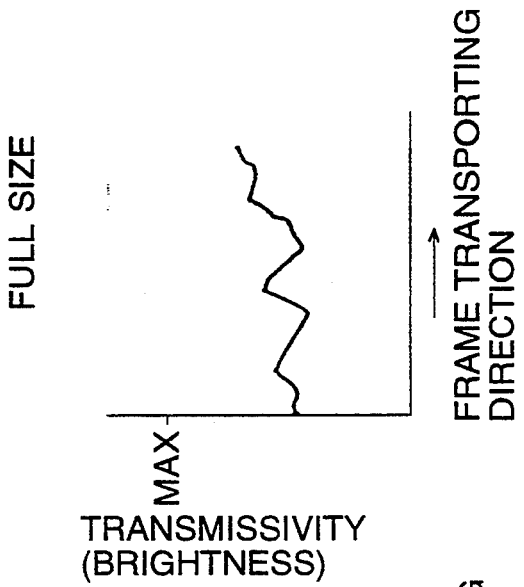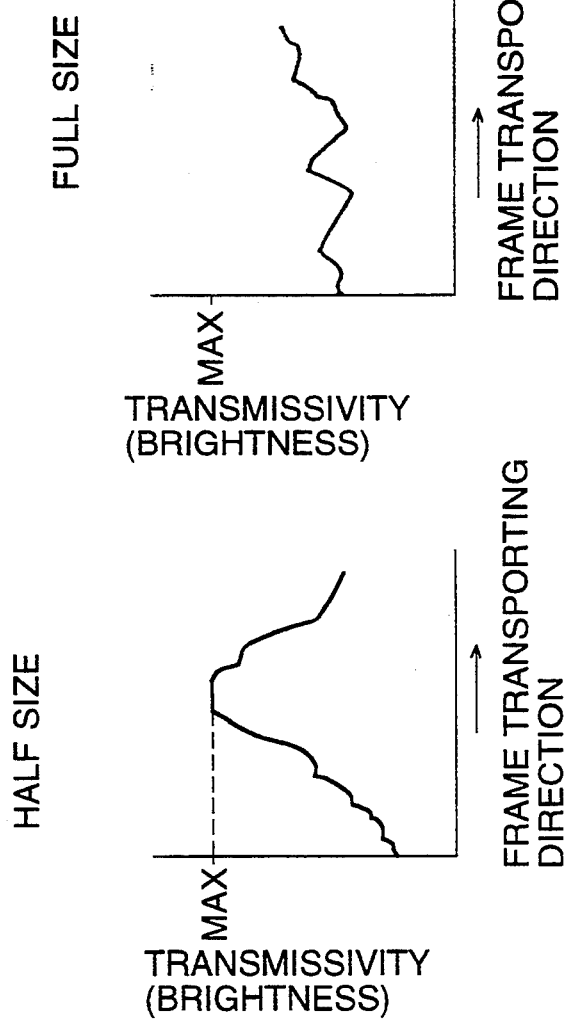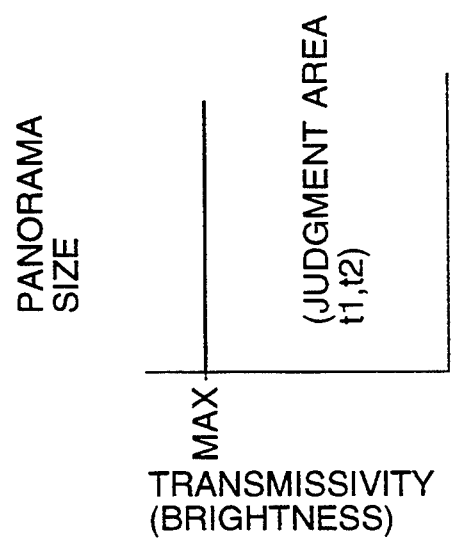

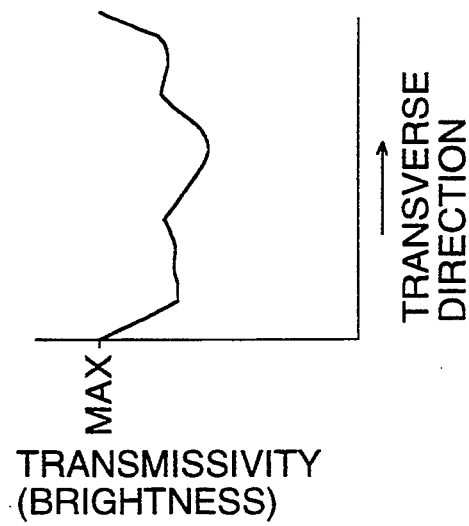
FIG. 10 (c) FULL SIZE
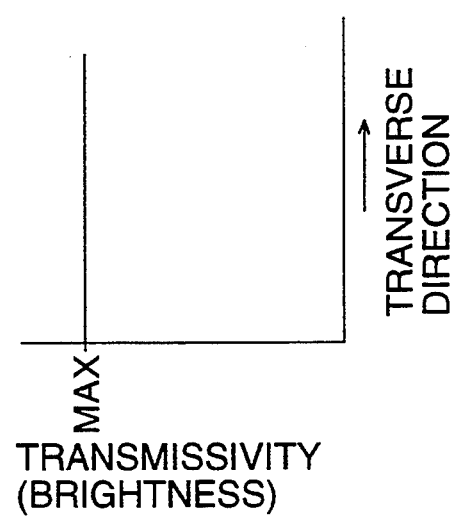
FIG. 10 (b) HALF SIZE
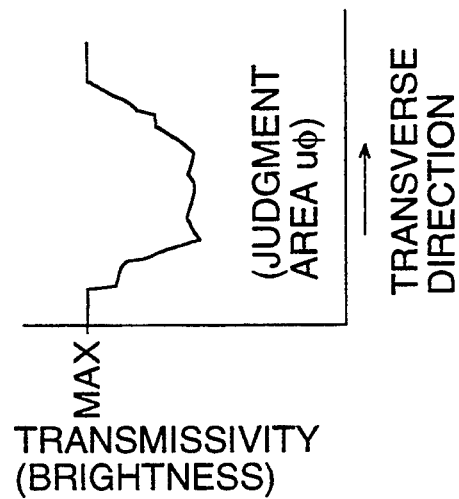
FIG. 10 (a) PANORAMA SIZE

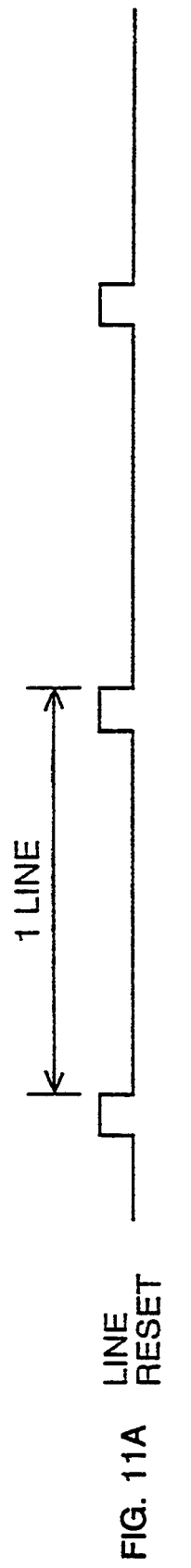
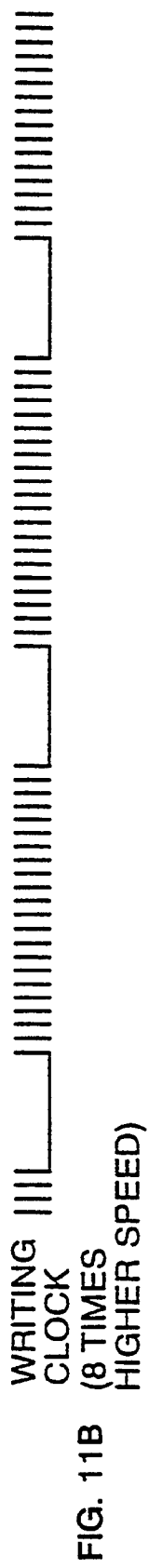
FIG. 11A LINE RESET
FIG. 11B WRITING CLOCK (8 TIMES HIGHER SPEED)

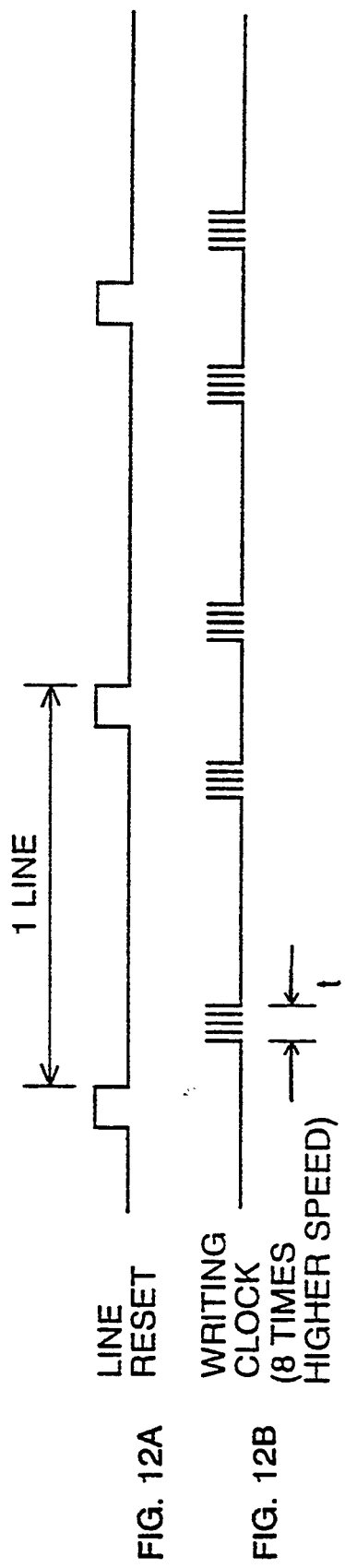

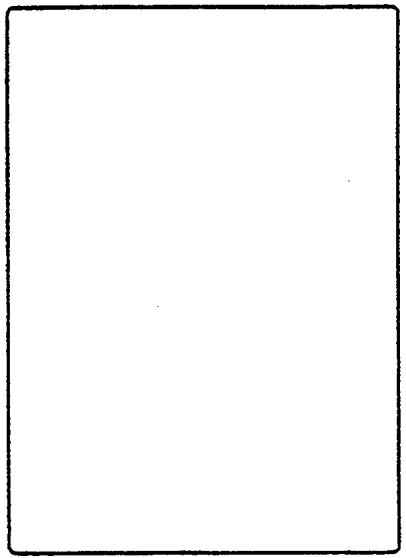
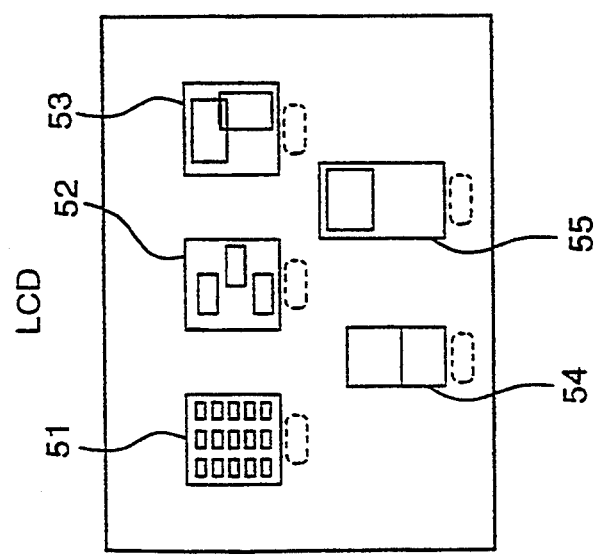
FIG. 25C
CRT 2
FIG. 25B
CRT 1
FIG. 25A
LCD

CRT 2

CRT 1

LCD

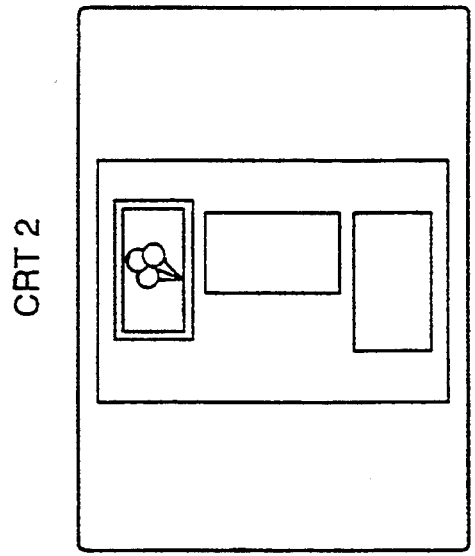
FIG. 27C  CRT 2
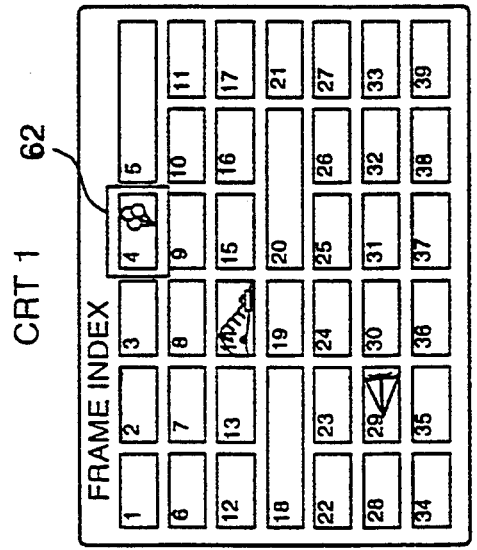
FIG. 27B  CRT 1
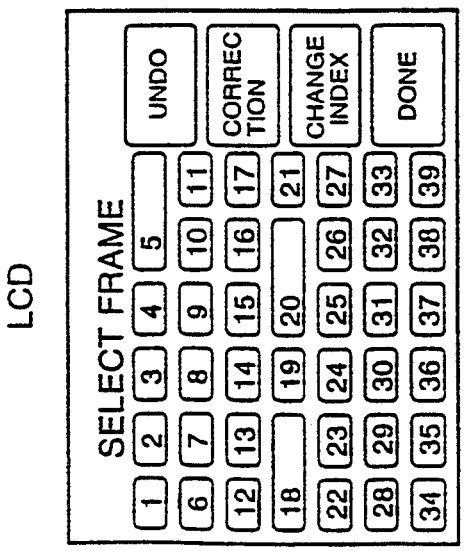
FIG. 27A  LCD

LCD

CRT 1

CRT 2

CRT 2

CRT 1

LCD

CRT 2

CRT 1

LCD

FILM IMAGE EDITING APPARATUS USING IMAGE DENSITY VARIATION DETECTION

BACKGROUND OF THE INVENTION

The present invention relates to a film image editing apparatus that reads from a developed photographic film a plurality of images photographed on the photographic film.

Heretofore, there has been available an apparatus wherein a plurality of images are inputted and they are edited according to a predetermined layout to be outputted as shown in Japanese Patent Examined Publication No. 21383/1992.

In the above-mentioned apparatus, however, images (documents) are inputted from an input drum and then edited images are outputted, which means that the apparatus is not based on the assumption that images photographed on the photographic film are pre-processed. In addition, images photographed on a photographic film are usually in various sizes of plural kinds including normal picture size (full size), a panorama size which is oblong (i.e. long from side to side) and a half size. Therefore, it has been difficult to apply the apparatus.

In recent years, in particular, photographs in panorama size employing directly a 35 mm film which is most popular as a photographic film have become popular.

In the panorama size, upper and lower portions in a normal picture size (full size, 24 mm×36 mm) on a 35 mm film are light-shielded to create an oblong picture size (13 mm×36 mm). In addition, a low-aspect-ratio size (20 mm×36 mm) having an aspect ratio of 9;16 has also made its appearance. Incidentally, in the case of a print in L size from a full size image, a photographic paper size is 89 mm×127 mm, while that from a panorama size is 89 mm×254 mm and that from a low-aspect-ratio size is 89 mm×158 mm.

Further, there are also some cases wherein photographing in a half size wherein two pictures are recorded on a single picture area is carried out.

As stated above, the same 35 mm film can be used to provide has therein various picture sizes such as a full size, an oblong size (a panorama size and a low-aspect-ratio size), and a half size. In addition, there has recently been commercialized a camera wherein normal photographing (full size photographing) and panorama size photographing can be switched in the course of photographing on a single roll of film, thus a film having therein different picture sizes has made its appearance.

Therefore, it is necessary to detect a picture size and to conduct image processing based on the detected picture size when reading from a developed photographic film the images photographed on the film and editing them.

The editing apparatus as disclosed in the Japanese Patent Examined Publication mentioned above is one wherein a display indicates only images after editing. In the case of editing, therefore, it is not possible to observe inputted images which were actually read. Accordingly, it is necessary to put inputted images in order and to decide a layout before conducting a work which requires skillfulness and is specialized. With the background mentioned above, easy editing work has been desired.

In some cases, image colors are required to be corrected in the course of editing, and Japanese Patent Publication Open to Public Inspection No. 272755/1987 (hereinafter referred to as Japanese Patent O.P.I. Publication) discloses one wherein color correction by means of cursor input or the like on a color chart is made for each picture area and a point is designated on each picture area so that color before correction and color after correction on the designated point may be indicated for judging whether the correction has been made appropriately or not.

However, even in the case of the color correction mentioned above, there still is an occasion where actual color correction level is determined by the sixth sense of an operator who repeats his work to change an amount of correction after observing the corrected color. Therefore, it is difficult to finish color correction through a single operation, which has been troublesome.

With regard to the foregoing, a requirement for color correction is well-defined to a certain extent on images, including a demand for correct colors of human skins, blue sky and green forest, and there has been demanded a method of simple color correction.

In view of the situation mentioned above, an object of the invention is to provide a film image editing apparatus which can read correctly images photographed on a photographic film and edit them even in the case where each photographic film has a different picture size or the same photographic film has different picture sizes.

Further object of the invention is to make editing work easy by enabling an operator to edit while observing actually plural images which have been read from a developed photographic film and are on standby for editing, and further to make image correction (especially, color correction) and layout editing easy.

SUMMARY OF THE INVENTION

For the object mentioned above, the film image editing apparatus of the invention comprises image information reading means (A) that reads image information on each picture area having an ordinary picture size from a developed photographic film as shown in FIG. 1, picture size detecting means (B) that detects a picture size of each image from density variation information on each picture area to be read based on image information read by the image information reading means, editing means (C) that edits, according to input from the outside for instructing the editing of a plurality of images decided by both image information read by the image information reading means and the picture sizes detected by the picture size detecting means, and output means (D) that outputs images edited by the editing means.

In this case, the image information reading means (A) is preferably one wherein the photographic film and the line sensor both mentioned above are moved relatively in the secondary scanning direction while the line sensor is scanning a developed photographic film in the primary scanning direction, and thereby image information on the photographic film is read by the line sensor.

It is preferable that the picture size detecting means (B) mentioned above comprises a density variation detecting means that detects the pattern of density variation in the predetermined direction on each picture area to be read based on image information read by the image information reading means and a picture size judging means that judges picture size of each image by comparing the pattern of density variation detected by the density variation detecting means with a reference pattern.

It is preferable that the density variation detecting means is one wherein the pattern of density variation in the longitudinal direction on each of non-image recording areas formed to have a predetermined width over and below the oblong size picture area on a full size frame can be detected. Or, the density variation detecting means may be one wherein the pattern of density variation in the longitudinal direction on an area formed to have a predetermined width between two half size picture areas on a full size frame can be detected. When detecting the pattern of density variation on an area with a predetermined width formed as a non-image recording area due to the specific picture size, the density variation detecting means is preferably one wherein a binary coding means that binary-codes image information read by the image information reading means is provided, and the pattern of density variation is detected based on data binary-coded by the binary-coding means.

Further, it is preferable that the editing means (C) is provided with a display means capable of index-displaying plural images decided by both image information read by the image information reading means and picture sizes detected by the picture size detecting means.

It is further preferable that the editing means (C) is provided with a correction image selecting means that selects the image to be corrected from a plurality of images decided by both image information read by the image information reading means and picture sizes detected by the picture size detecting means, and with a correcting means that corrects the selected image according to input for instructing the correction.

The correcting means in this case may preferably be provided with a color correction area designating means that designates an area where color correction is made on an original image, a target color selecting means that selects a target color from plural target colors established in advance as a target color for color correction, and a color converting means that performs color conversion for images so that the designated area may match the selected target color.

The editing means (C) mentioned above may further be provided with an edition image selecting means that selects images to be edited from plural images decided by both image information read by the image information reading means and picture sizes detected by the picture size detecting means and with a layout editing means that edits the selected images according to the predetermined layout.

In the above constitution, image information on each picture area having a normal picture size is first read from a developed photographic film by the image information reading means (A). Concretely, the developed photographic film is scanned in the primary scanning direction and in the secondary scanning direction by a line sensor, thus image information recorded on a photographic film is read on a two-dimensional basis.

Next, a picture size of each image is detected by the picture size detecting means (B) from density variation information on each picture area to be read based on image information read by the aforementioned image information reading means.

Concretely, the pattern of density variation in the predetermined direction on each picture area to be read is detected based on image information read. Then, the pattern of density variation detected is compared with a reference patterns corresponding to specific pattern of density variation on each picture size, and a picture size of each image is judged based on the results of the aforesaid comparison.

In this case, detection of the pattern of density variation may be made in the longitudinal direction of an area with a predetermined width formed as a non-image recording area outside an oblong size (panorama size, low-aspect-ratio size) area or a half size area on a full size frame. Thus, a full size, an oblong size and a half size may be judged by whether or not the pattern of density variation on the area mentioned above corresponds to the non-image recording area for an oblong size or a half size.

The pattern of density variation mentioned above has only to distinguish between an image recording area and a non-image recording area. Therefore, image information read may be binary-coded based on a reference level capable of distinguishing between an image recording area and a non-image recording area, and the pattern of density variation may be detected based on the binary-coded data.

Next, a plurality of images decided by both image information read by the image information reading means and picture sizes detected by the picture size detecting means are edited by the editing means (C) according to input from the outside for the edition.

In the case of editing, when a display means that index displays a plurality of images before editing is provided, an operator can observe the displays and select them for doing editing work including correction, which results in easy and efficient work because an operator can edit while he is observing index-displayed images.

It is also possible to correct images by selecting freely from a plurality of images before editing, and with regard to color correction, in particular, when selecting from a plurality of target colors established in advance as target colors for color correction while designating the area for color correction on an original image, color conversion of images can be conducted so that the designated area may match the selected target color. Namely, when colors which are frequently desired to be used (for example, skin color, blue, green, etc.) are established in advance as target colors, only selection of the target colors and designation of the portion to be changed to the target color on an original image can cause color conversion on the designated portion, thus the desired color correction can be made through a single operation.

When editing, images are selected from a plurality of images before editing and selected images are edited according to a predetermined layout. Therefore, when a plurality of layouts are established in advance so that they may be selected, it is possible to conduct layout edition simply.

Finally, images edited by the editing means mentioned above are outputted by output means (D).

BRIEF DESCRIPTION OF THE DRAWINGS.

FIG. 9(a)–9(c) are diagrams showing a pattern of density variation caused by picture sizes.

FIG. 10(a)–10(c) are diagrams showing a pattern of density variation caused by picture sizes.

FIG. 11A and 11B are time charts showing a full image reading mode.

FIG. 12A and 12B are time charts showing a partial image reading mode.

FIG. 16(a) and 16 (b) are diagrams showing a pattern of density variation in a half size.

FIGS. 25A, 25B and 25C are diagrams showing display example 1 for a touch panel shown in FIG. 25A; and an input CRT 1 shown in FIG. 25B; and an output CRT 2 shown in FIG. 25C;

FIGS. 27A, 27B and 27C are diagrams showing display example 3 for a touch panel shown in FIG. 27A; an input CRT 1 shown in FIG. 27B; and an output CRT 2 shown in FIG. 27C;

DETAILED DESCRIPTION OF THE INVENTION

Examples of the invention will be explained as follows.

Figure 1:
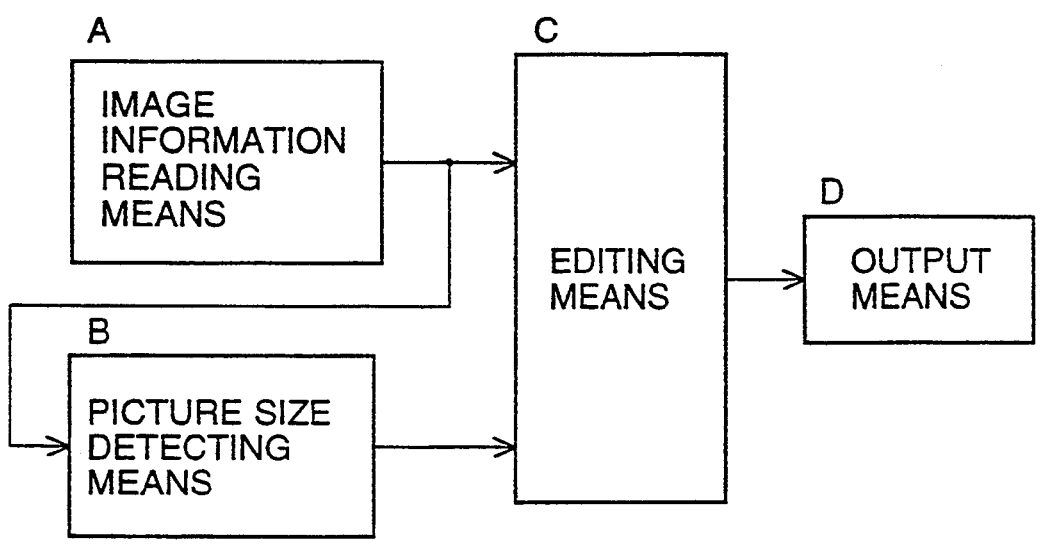
FIG. 1 is a block diagram in terms of function showing the constitution of the invention.
Figure 2:
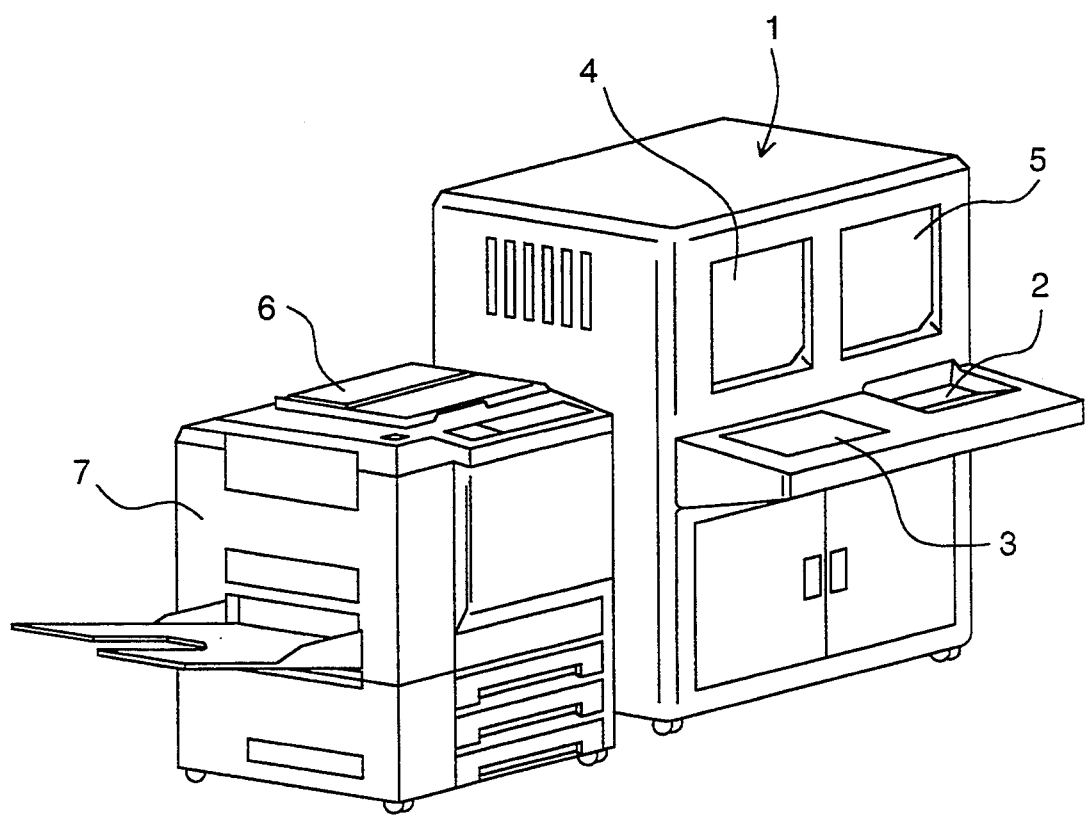
FIG. 2 is a sketch drawing of a film image editing apparatus showing an example of the invention.

FIG. 2 is a sketch drawing of a film image editing apparatus.

On the table of image editing apparatus main body 1 including a film reading device, there are provided cassette inlet 2 for film reading and touch panel (LCD) 3 of a liquid crystal type for operation. Further, there are provided first CRT 4 for indicating input images and second CRT 5 for indicating output images on a side by side basis. Printer 7 provided with scanner 6 for reading reflection type originals can be connected to the image editing apparatus main body 1.

Figure 3:
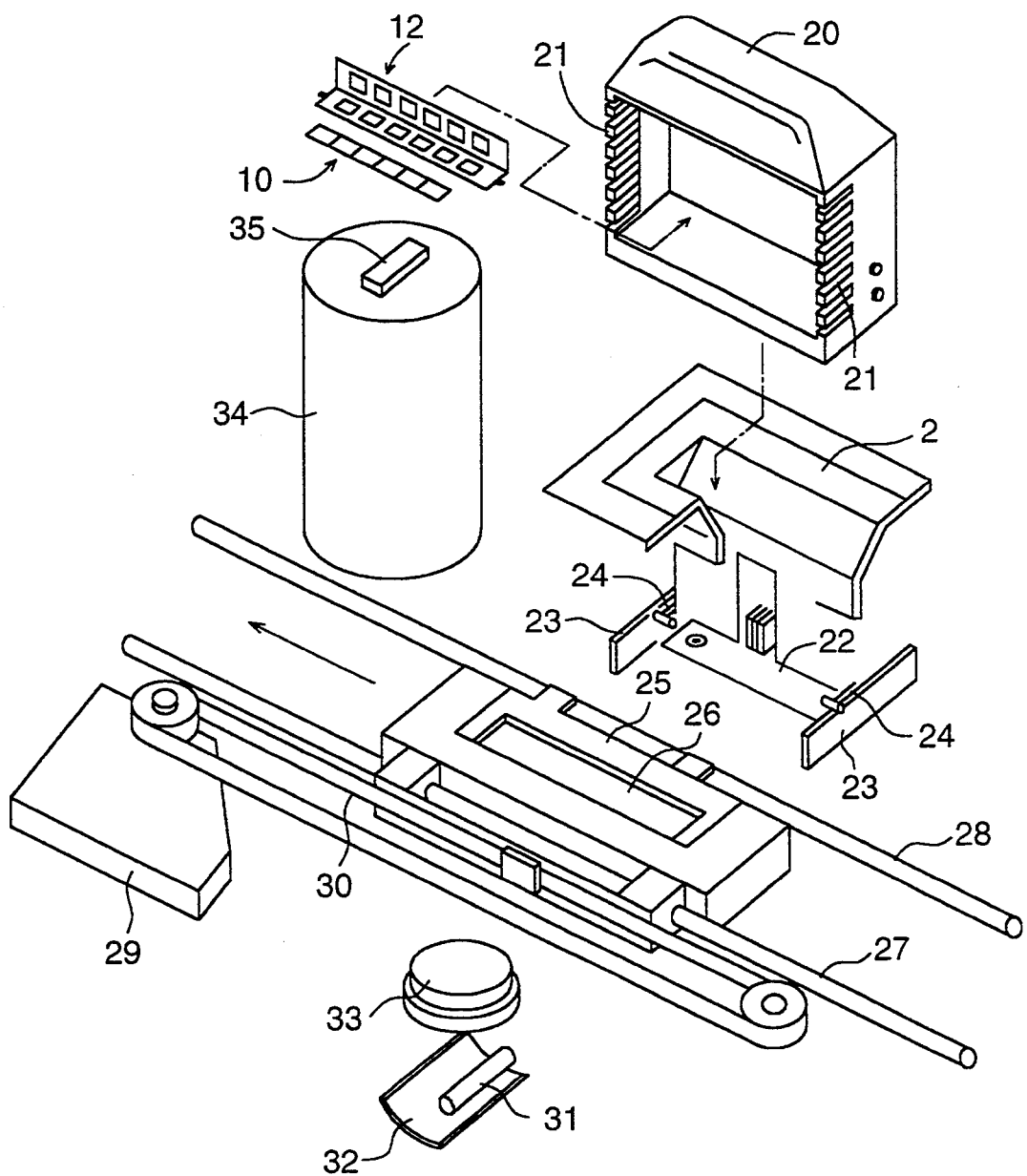
FIG. 3 is a structural diagram of a film reading device.

FIG. 3 is a structural drawing of a film reading unit portion.

In this example, developed photographic films (negative films) 10 each having 6 frames are held by film holder 12, and film holders 12 in the maximum quantity of 7 are housed in cassette 20. The cassette 20 is inserted into the cassette inlet 2.

Figure 4:
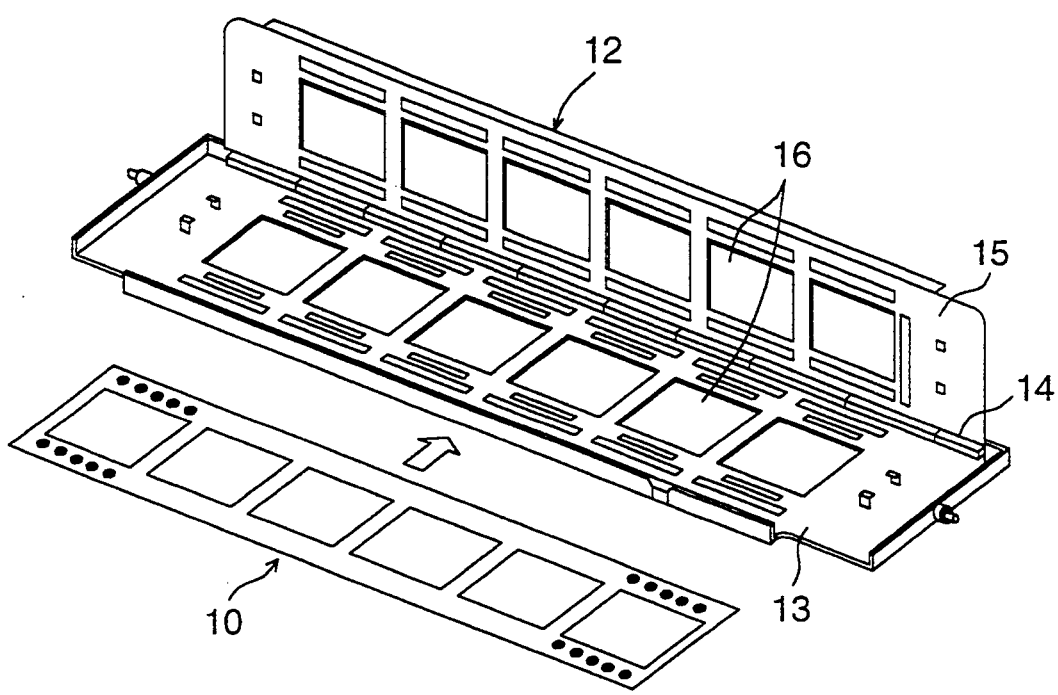
FIG. 4 is a perspective view of a film holder.

The film holder 12 is provided with lower frame 13 and upper frame 15 affixed through shaft 14 in the hinge type as shown in FIG. 4, and photographic film 10 is sandwiched between the lower frame 13 and the upper frame 15 to be held. On the lower frame 13 and the upper frame 15, there are naturally formed apertures 16 equivalent in quantity to the number of frames (6 frames).

Cassette 20 is a case whose front side is open and 7 steps of holding grooves 21 are formed on each of both sides of the cassette, and film holders 12 in quantity of the maximum 7 can be held in the cassette with their both ends guided by holding grooves 21 at both sides of the cassette in the state that film surfaces are in parallel with each other. Each film holder in the cassette can be drawn out in the direction of the film surface.

Incidentally, in the example, film holders 12 for negative films are housed in cassette 20, and 6 frames ×7 holders, the maximum 42 frames in total can be housed in the cassette. On the other hand, when using a film holder for a positive film capable of holding 5 sheets of positive films each being a frame, 5 frames×7 holders, the maximum 35 frames in total can be housed. Film holders for a negative film and those for a positive film can naturally be housed mixedly.

In order for an arbitrary film holder 12 to be picked out of cassette 20 in cassette receiver 22 communicating with cassette inlet 2 and transported to a reading position, there are provided film holder transport devices 23 and 23 on both sides of the cassette receiver 22.

The film holder transport devices 23 are moved up or down by an elevating mechanism to the position where the film holder 12 to be transported is housed so that holding arms 24 thereon may hold the film holder 12, and then, the film holder transport devices are further moved back or forth by a sliding mechanism so that the film holder held by the holding arms 24 may be transported onto secondary scanning table 25.

The secondary scanning table 25 is one on which film holder 12 transported by film holder transport devices 23 is placed, and it is provided with aperture 26 which faces a frame on a film. The secondary scanning table 25 is reciprocated by belt 30 driven by a stepping motor that is housed in driving unit 29 while being guided by two guide rails 27 and 28 extending in the direction perpendicular to the transporting direction of the film holder transport devices 23.

Under the secondary scanning table 25, there are provided lamp 31, converging mirror 32 and condenser lens 33 so that light emitted from the lamp 31 may be converged by the converging mirror 32 and condenser lens 33 to illuminate photographic film 10 held by the film holder 12.

On an optical path of light passing through the photographic film 10 over the secondary scanning table 25, there is provided CCD line sensor 35 for color use through reading lens system (including a diaphragm and a filter) 34. The CCD line sensor 35 is one wherein a large number of pixels (photoelectric conversion elements) are arranged in the direction (primary scanning direction) perpendicular to the reciprocating direction (secondary scanning direction) of the secondary scanning table 25.

With regard to reading operation, after cassette 20 wherein film holder 12 is housed is set on cassette inlet 2, designated film holder 12 is transported by transport device 23 onto secondary scanning table 25 from the cassette 20.

After this, the secondary scanning table 25 is moved by driving unit 29 so that signals of the CCD line sensor 35 may be read while the film holder 12 is moving, thus image information on all frames in the film holder 12 or image information of the designated frame can be obtained.

In this case, an unillustrated origin mark is provided on the secondary scanning table 25, and when the origin mark is detected by an affixed unillustrated photosensor, the original position can be detected. When reading corresponding to an amount of driving (an amount of rotation of a stepping motor) of the driving unit 29 from the original position, each frame, namely each picture area having an ordinary picture size (full size) can be read in succession.

After completion of reading, the driving unit 29 moves reversely the secondary scanning table 25 to return it to its initial position. Thereby, the film holder 12 on the secondary scanning table 25 is returned again to its original portion on the cassette 20 by the transport device 23.

Incidentally, there are rough scanning and fine scanning for reading image information from developed photographic film 10.

Rough scanning means reading ,images of all frames in the high speed (for example, 8 times greater speed) mode, namely reading roughly by reducing the number of pixels to be read, for the purpose of picture size detecting and index-displaying. In the case of 8 times greater speed, for example, the number of pixels to be read is reduced to $\frac{1}{8}$ in the primary scanning direction and secondary scanning direction respectively (totaling 1/64). In this case, images of all frames on all film holders 12 are read roughly at 8 times greater speed while a plurality of film holders 12 in the cassette 20 are transported onto the secondary scanning table 25. In the case of rough scanning, each film holder 12 is scanned twice, and the first scanning is called prescanning and the second one is called index-scanning. Namely, image data are obtained through the pre-scanning at 8 times greater speed, and then, reading conditions wherein gradation balance or the like is corrected based on the image data are established. In the course of the index-scanning at 8 times greater speed in the second scanning, image data are obtained while images are corrected based on the established reading conditions mentioned above.

Fine scanning means reading images of the selected frame in the normal mode, namely reading without reducing the number of pixels to be read, for the purpose of final output to printer 7 or the like after editing. In this case, the film holder 12 containing the selected frame is transported from the cassette 20 onto the secondary scanning table 25, and images of the selected frame are read at the normal speed from the film holder 12. Even in this case of reading, correction is made with reading conditions established based on the data obtained in the pre-scanning mentioned above.

Figure 5:
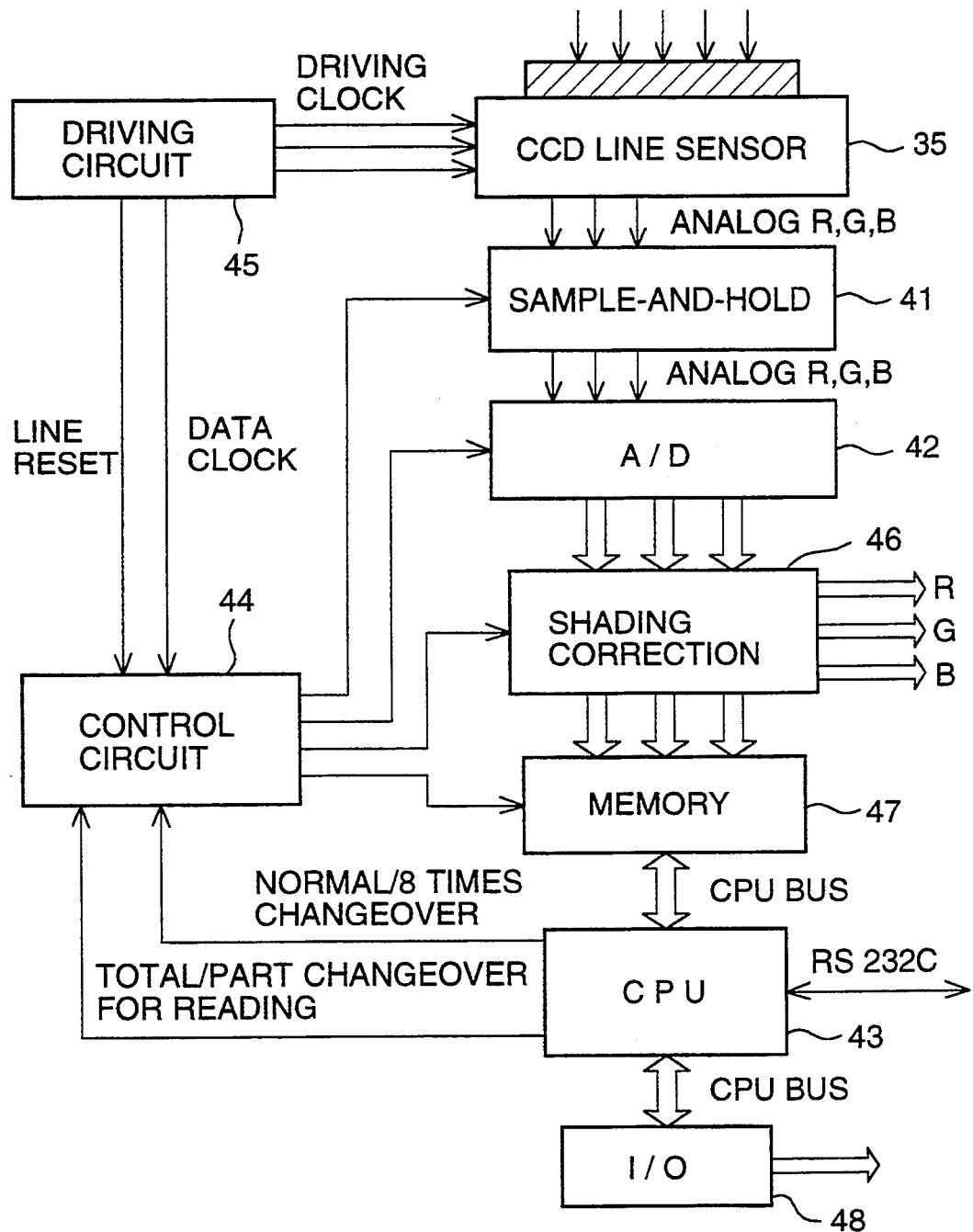
FIG. 5 is a block diagram showing the circuit structure of a film reading device.

FIG. 5 is a block diagram showing the circuit arrangement for a film reading unit.

Analog image signals for each of the three primary colors (R, G and B) outputted from the CCD line sensor 35 for color use mentioned above are inputted in A/D converter 42 through sample-and-hold circuit 41, and the analog image signals are converted to digital image signals of each of three primary colors in the A/D converter 42.

Figure 6:
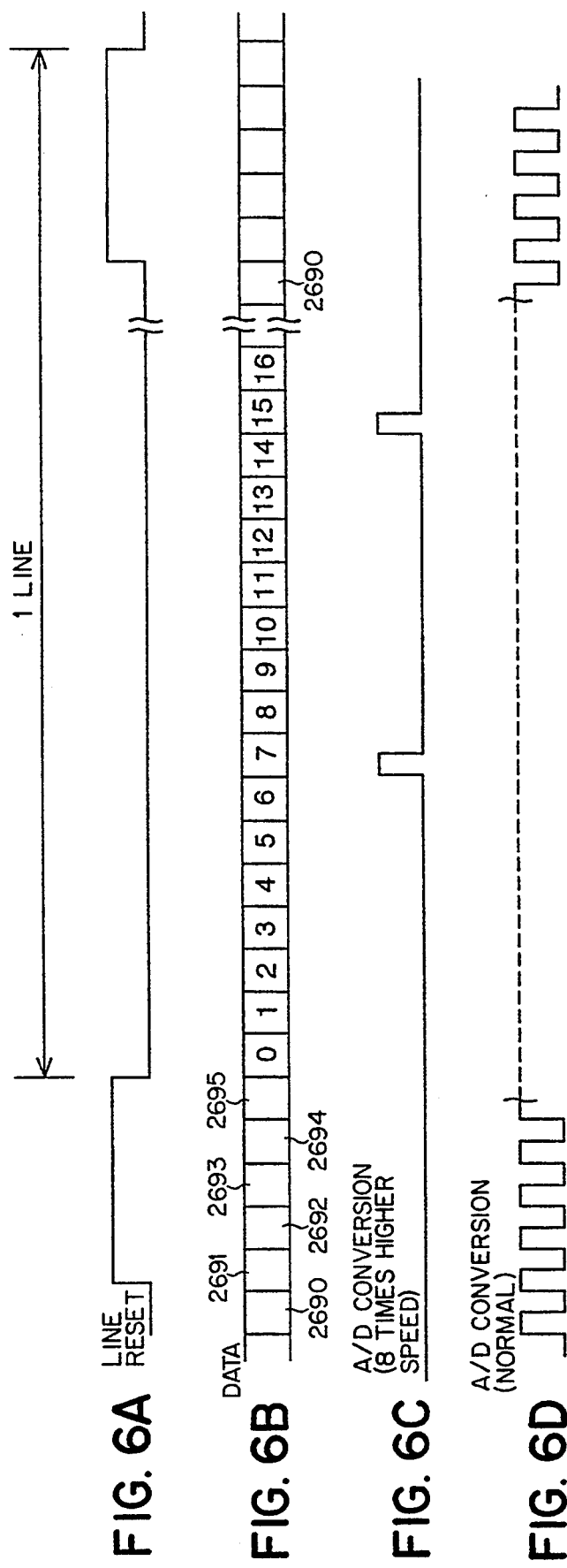
FIG. 6A, 6B, 6C and 6D are time charts showing a normal mode and an 8 times greater speed scanning mode.

In this case, CPU 43 is connected to an actuator or a sensor in the mechanism portion shown in FIG. 3, and it has a function of controlling reading operation of the mechanism portion and a function to instruct to control circuit 44 either a normal mode for reading image data of all pixels or an 8 times greater speed mode reducing the number of pixels to be read to $\frac{1}{8}$ in both the primary scanning direction and the secondary scanning direction, as a data reading mode. The control circuit 44 receives the signal for switching between normal/8 times higher modes, and controls sample-and-hold circuit 41 and A/D converter 42 in the normal mode or 8 times greater speed mode synchronizing with data clocks and line reset signals in driving circuit 45 that drives CCD line sensor 35 based on reference clock signals from an unillustrated oscillator, thus, it switches between fine scanning and rough scanning. Incidentally, in the normal mode or 8 times greater speed mode, A/D conversion is made at the timing shown in FIG. 6C and 6D.

Digital image signals outputted from the A/D converter 42 are subjected to shading correction made by shading correction circuit 46. In the first scanning (pre-scanning) in rough scanning, data reading for establishment of conditions for correcting colors or the like is conducted, and in the second scanning (index-scanning) in rough scanning or in fine scanning, correction is made according to conditions for correction established based on the aforementioned scanning, to be stored in a frame memory in the later stage.

Incidentally, photographic film 10 to be read is one wherein a panorama size picture area photographed with upper and lower shielded portions on a normal full size picture area and a half size picture area obtained by dividing a normal full size picture area into two equal parts are existing mixedly with a full size picture area. For image processing for editing which is conducted based on image signals obtained by reading the photographic film 10, picture sizes on the film need to be distinguished.

For the purpose of distinguishing picture sizes, therefore, digital image signals obtained through A/D conversion made by A/D converter 42 are stored temporarily in memory 47, and picture sizes are distinguished automatically based on the stored data.

Here, CPU 43 has a function to control, through control circuit 44, the operation of writing digital image signals to memory 47. Based on the digital image signals stored in the memory 47, picture sizes are distinguished in the manner mentioned later, and the results of the distinguishment are outputted to an image processing circuit for editing through I/O interface 48.

Next, how picture sizes are detected by the CPU 43 will be explained.

Basic specific characteristics for detection of picture sizes will be explained first.

Figure 7:
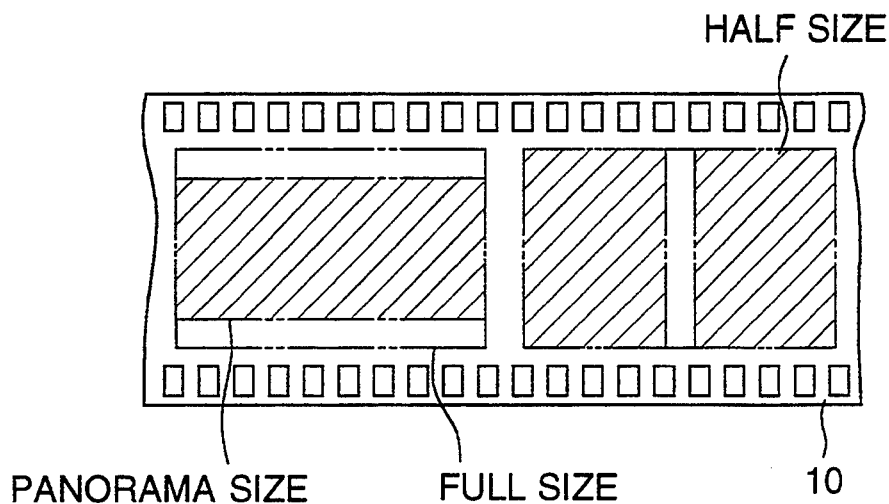
FIG. 7 is a diagram showing how different picture sizes are mixed in a photographic film.

Photographic film 10 to be read is one wherein a full size picture area, a panorama size picture area and a half size picture area are existing mixedly as shown in FIG. 7. A panorama size (or low-aspect-ratio size) which is oblong compared with a full size is formed by narrowing the full size picture area vertically with upper and lower non-image recording portions (light-shielded portions) each having a predetermined width. A half size is formed by dividing a full size picture area into two equal image-recording areas with a non-image recording portion having a predetermined width extending vertically (transverse direction of the film) on the central portion of the full size picture area.

Therefore, if non-image recording portions (light-shielded portions) within a full size picture area can be distinguished based on image signals which have been read as a full size picture area, it is possible to distinguish a full size, a panorama size and a half size.

Figure 8:
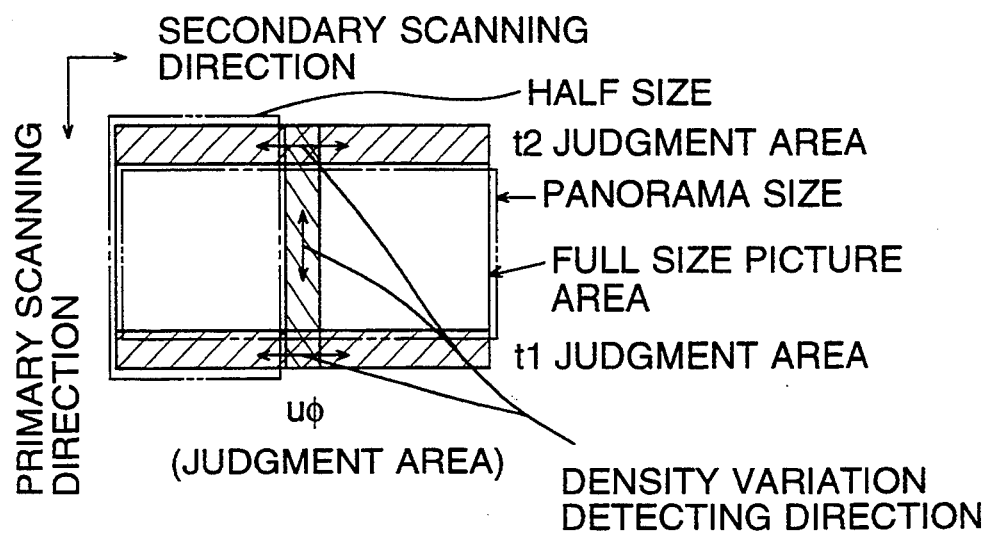
FIG. 8 is a diagram showing detecting areas (judgment areas) for density variation.

For example, there is detected density (transmissivity) variation in the longitudinal direction (secondary scanning direction in the present example, being in accord with the film frame feeding direction) within each of lower and upper portions which are non-image recording portions for a panorama size assumed respectively as judgment area t1 and judgment area t2 (see FIG. 8).

In this case, when the read picture size is a panorama size, base density (minimum density) showing the maximum transmissivity is fixed without being changed (see FIG. 9 (a)) because the aforementioned judgment areas t1 and t2 are nonimage recording portions. When the read picture size is a full size, density changes at random at the level higher than base density (transmissivity lower than the maximum transmissivity) because images are recorded on the judgment areas t1 and t2 (see FIG. 9 (c)), while when the read picture size is a half size, the central portion shows the maximum transmissivity corresponding to base density (minimum density) because a non-image recording portion exists at the center in terms of the direction of detecting density variation (see FIG. 9 (b)).

A non-image recording portion between two half size picture areas on a full size picture area is assumed as judgment area u$\phi$ (see FIG. 8), and density variation in the longitudinal direction (primary scanning direction in the present example and is in accord with the transverse direction of the film) on the judgment area u$\phi$ is detected.

In this case, when the picture size is a panorama size, a non-image recording portion having a predetermined width exists at each of starting and ending sides in the density detecting direction. Therefore, each of starting side and ending side shows the maximum transmissivity (minimum density) corresponding to each non-image recording portion having a predetermined width, and an in-between portion show relatively high density corresponding to image recording (see FIG. 10 (a)).

When the picture size is a half size, on the other hand, the judgment area u$\phi$ mentioned above agrees with a nonimage recording portion. Therefore, base density (minimum density) showing the maximum transmissivity is fixed (see FIG. 10 (b)). Further, when the picture size is a full size, the portion from the starting point to the ending point is an image recording area. Therefore, density is kept to be higher than the minimum density (see FIG. 10 (c)).

As stated above, a non-image recording portion (light-shielded portion) formed by a panorama size or by a half size on a full size picture area is specified as a judgment area, and the pattern of density variation in the longitudinal direction on the judgment area is detected. Thus, picture sizes (a full size, a panorama size and a half size) can be detected based on image signals read as a full size picture area, by judging agreement between the detected pattern and the pattern specific to each picture area (reference pattern)

According to the basic characteristics mentioned above, CPU 43 detects picture sizes based on digital image signals stored in memory 47. However, the digital image signals stored in the memory 47 are made to be rough scanning data for 8 times greater speed because they are the data used only for detection of picture sizes.

Further, the memory 47 may also be arranged so that image signals on the entire portion on a full size picture area may be stored in the memory 47. However, what is needed for detection of picture sizes is only an image signal of a judgment area that is a non-image recording portion (light-shielded portion) formed by a panorama size or by a half size on a full size picture area. Therefore, CPU 43 is arranged to be capable of giving instruction to control circuit 44 either for storing all areas in the memory 47 (full reading mode) or for storing only image signals of the aforementioned judgment area in the memory 47 (partial reading mode). Therefore, the control circuit 44 can output writing clocks shown in FIG. 11 or FIG. 12 to the memory 47 according to the instruction concerning storage area from the CPU 43.

Next, contents of processing for detection of picture sizes in CPU 43 will be explained as follows, referring to flow charts shown in FIG. 13 and FIG. 14. These flow charts in FIGS. 13 and 14 correspond to picture size detecting means.

Figure 13:
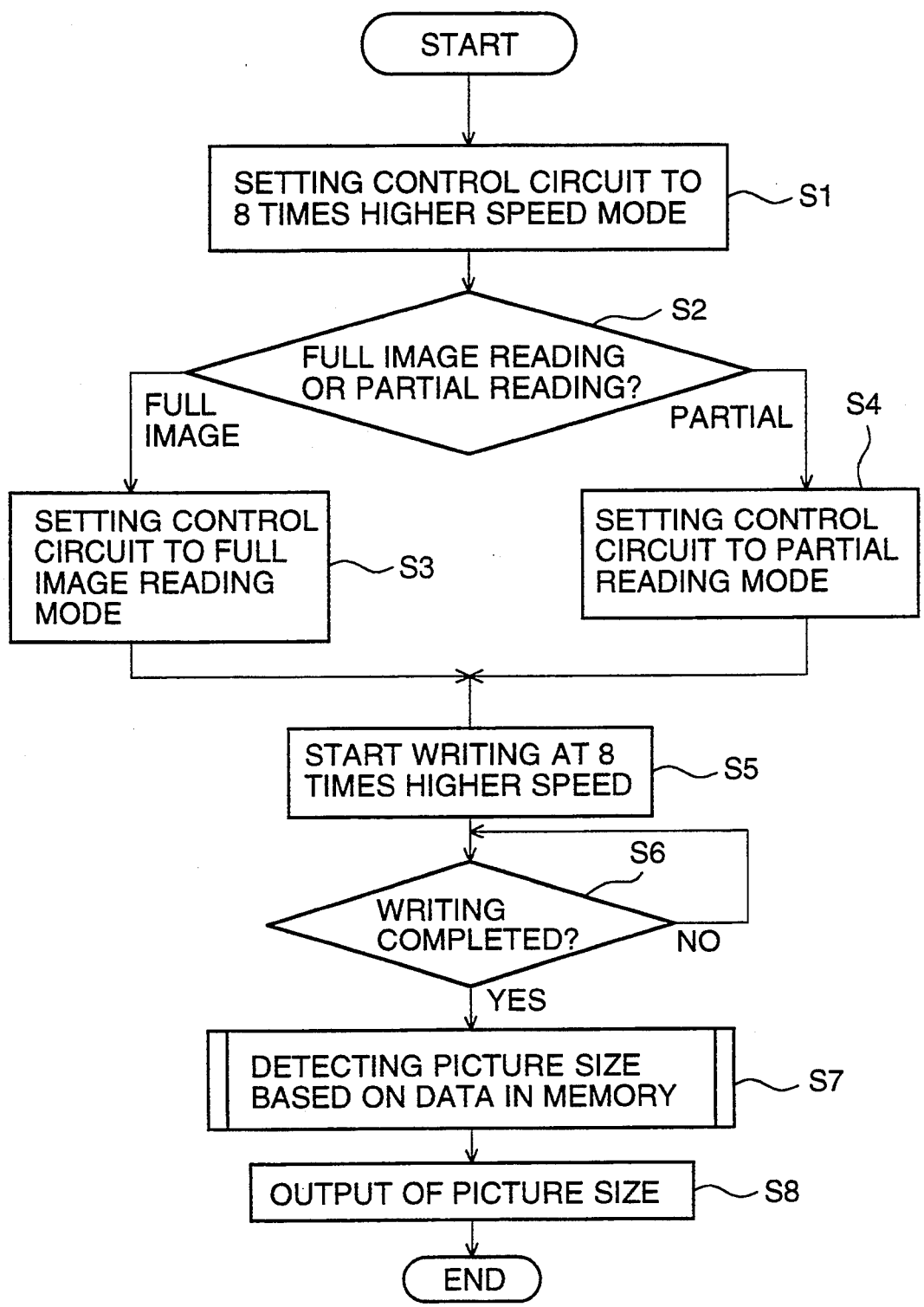
FIG. 13 is a time chart showing. the total flow of picture size detection.

A flow chart in FIG. 13 shows a total flow of detection of picture sizes.

In step 1 (shown as S1 in the figure; which applies also to the following cases), the control circuit 44 is set to a mode of 8 times greater speed.

Then, in step 2, discrimination is made for whether a full image reading mode is selected or a partial reading mode is selected. Depending on the results of the discrimination, the sequence advances to Step 3 or to step 4 to set the control circuit 44 to the full image reading mode or the partial reading mode so that image signals of a full image or image signals of only a judgment area may be stored in the memory 47.

In step 5, actual writing of digital image signals on the memory 47 is started and is kept until the moment when completion of the writing is confirmed in Step 6.

Upon completion of writing of image signals on the memory 47, a pattern of density variation in the predetermined direction on a picture area is detected in step 7 based on the data stored in the memory 47, and the pattern of density variation thus detected is compared with a reference pattern that is specific to each picture size, thus, a picture size can be detected.

In step 8, the detected picture size is outputted to an image processing circuit for editing use in the later step to be stored therein.

Figure 14:
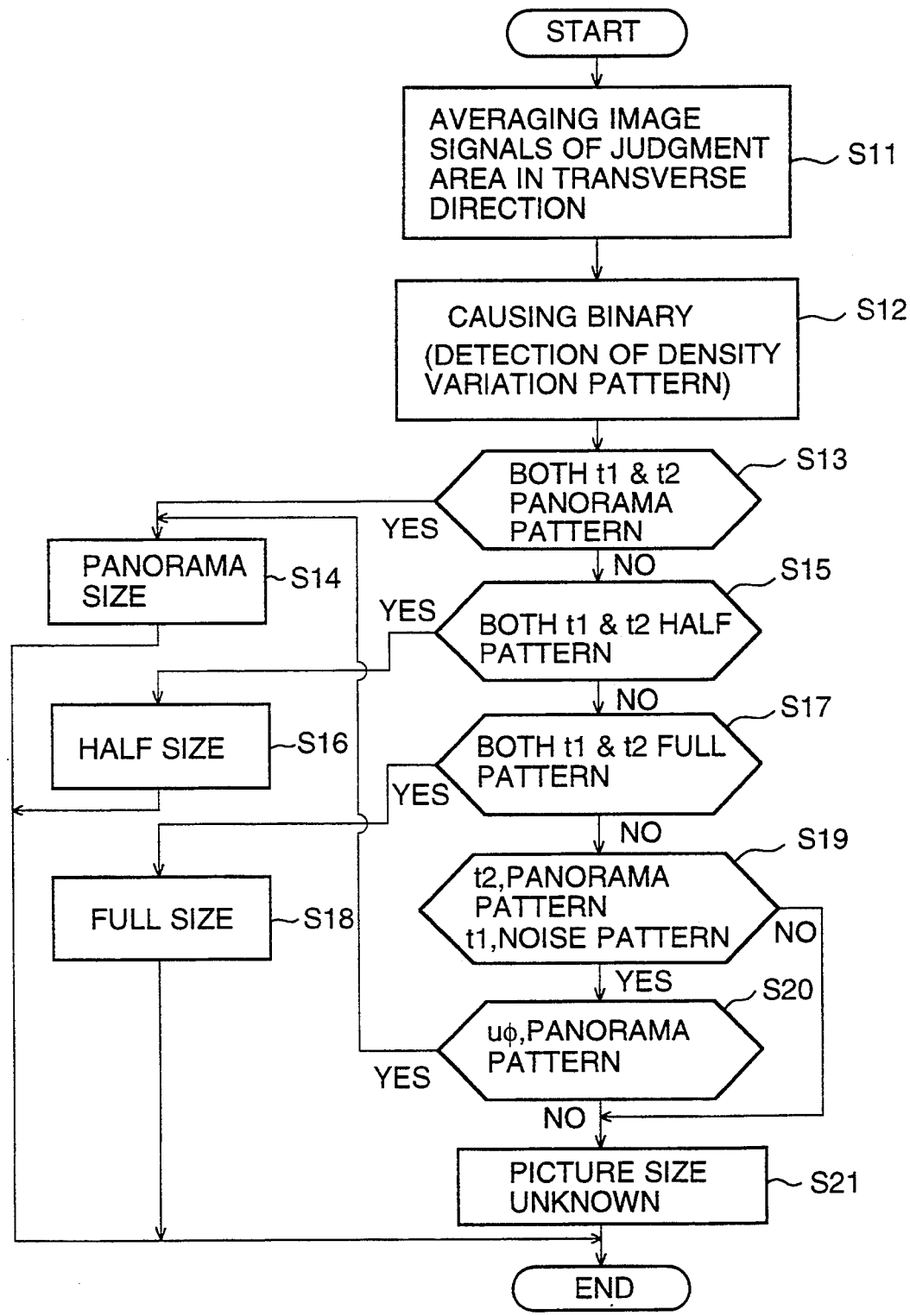
FIG. 14 is a flow chart showing the detailed contents of picture size detection.

A flow chart shown in FIG. 14 indicates in detail how a picture size is detected in step 7 in the flow chart shown in FIG. 13.

In step 11, image signals in each of judgment areas t1, t2 and u$\phi$ (see FIG. 8) are averaged in its transverse direction so that a pattern of density variation in the longitudinal direction on each judgment area may be detected based on the mean value obtained through averaging. Incidentally, averaging may also be made in the direction for obtaining a pattern of density variation, in addition to the transverse direction.

In step 12, digital image signals subjected to the averaging processing mentioned above are binary-coded. A threshold level in the aforementioned binary-coding is established to the intermediate value between base density of photographic film 1 (density corresponding to non-image recording area) and the maximum density on an image recording area, and is binary-coded to the density level corresponding to a non-image recording area (light-shielded area) and to the density level corresponding to the maximum density on an image recording area (see FIGS. 15–19).

The threshold level mentioned above may also be variably established based on the result of detection of base density (transmissivity of a base portion) of each photographic film.

Figure 15:
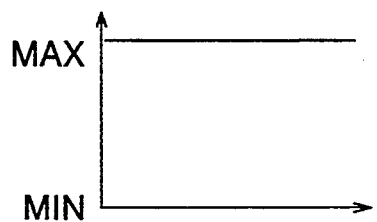
FIG. 15(a) and 15(b) are diagrams showing a pattern of density variation in a panorama size.
Figure 15:
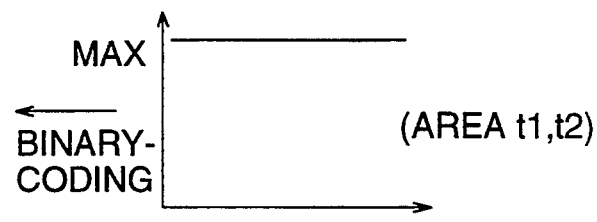
Figure 16:
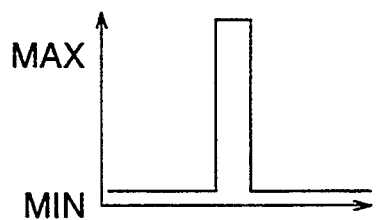
Figure 16:
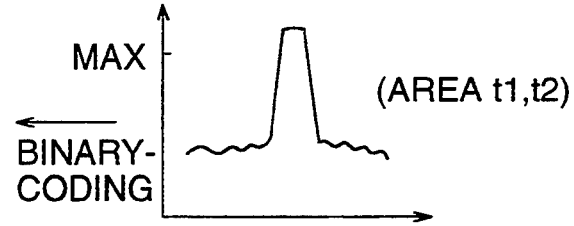

In step 13, discrimination is made for whether or not a pattern of density variation (pattern for indicating density variation with a binary number) in the secondary scanning direction detected on each of judgment areas t1 and t2 which are formed, as a non-image recording area (light-shielded area), respectively at the upper side and the lower side transversely on a full size picture area in the case of a panorama size agrees with a reference pattern of a panorama size representing the constant maximum transmissivity (corresponding to a base portion) as shown in FIG. 15 (a).

When the read picture area is of a panorama size, both two judgment areas t1 and t2 located respectively at the upper side and the lower side transversely on a film are light-shielded areas where no image is recorded. Therefore, each of them should show the density variation specific to a panorama size representing a constant maximum transmissivity as shown in FIG. 15 (a). In this case, the sequence advances to Step 14 and the read image is recognized to be of a panorama size.

On the other hand, when the pattern of density variation on each of judgment areas t1 and t2 does not show the density variation representing a constant maximum transmissivity shown in FIG. 15 (a), the sequence advances to step 15.

In step 15, for distinguishing between a full size and a half size, discrimination is made for whether or not the pattern of density variation detected on each of judgment areas t1 and t2 formed respectively at the upper side and the lower side as a non-image recording area agrees with the pattern that the central portion of a picture area only shows a non-image recording area (reference pattern for a half size).

In this case, when the detected pattern of density variation agrees with the reference pattern of a half size, the sequence advances to step 16 for recognizing that the picture size is a half size, while when it does not agree with the reference pattern, the sequence advances to step 17 for discriminating further whether or not the picture size is a full size remaining unchecked.

Figure 17:
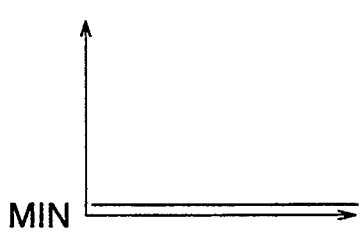
FIG. 17(a) and 17(b) are diagrams showing a pattern of density variation in a full size.
Figure 17:
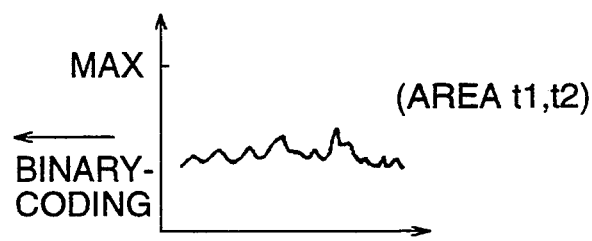

In step 17, discrimination is made for whether or not the pattern of density variation detected on each of judgment areas t1 and t2 agrees with the pattern shown in FIG. 17 (a) corresponding to the occasion where images are recorded (reference pattern of a full size). When both pattern of density variation on the upper and lower judgment areas t1 and t2 show continuous image recording, the sequence advances to step 18 for recognizing that the picture size is a full size.

On the other hand, when the detected pattern of density variation is discriminated not to agree with the pattern of density variation for a full size in step 17, strict criteria imply that the true picture size is unknown. However, when changing from a full size to a panorama size, a date is sometimes printed on the lower judgment area t1 which is not an image recording area originally for a panorama size. In this case, it is not possible to recognize in judgment in step 13 that the picture size is a panorama size.

Figure 18:
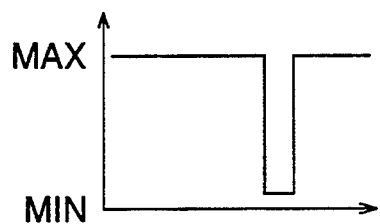
FIG. 18(a) and 18(b) are diagrams showing a pattern of density variation in the case of occurrence of noise in a panorama size.
Figure 18:
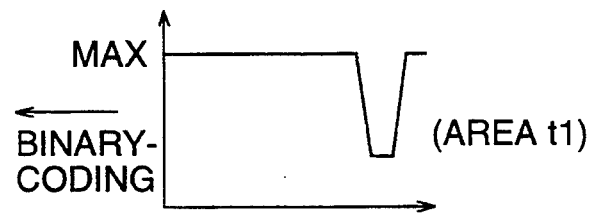

When the picture size is discriminated not to be a full size in step 17, therefore, the sequence advances to step 19 wherein when the pattern of density variation on the lower judgment area t1 represents a pattern wherein the pattern showing that the most area is a non-image recording area and only a part thereof is an image recording area as shown in FIG. 18 (a) appears although the density variation in the secondary scanning direction (longitudinal direction in a judgment area) for the upper judgment area t2 agrees with the pattern (FIG. 15 (a)) of a panorama size, a portion representing the aforementioned image recording is estimated to be a noise caused by printing of a date or the like, and the sequence advances to step 20 for further confirmation.

Figure 19:
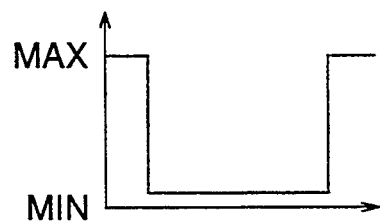
FIG. 19(a) and 19(b) are diagrams showing a pattern of density variation in the primary scanning direction in the case of a panorama size.
Figure 19:
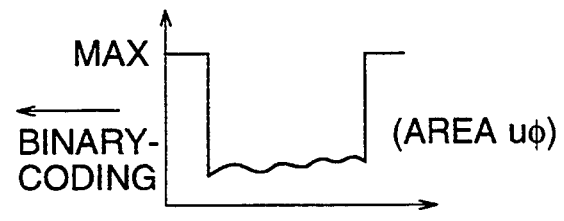

In step 20, a pattern of density variation in the longitudinal direction (that agrees with the primary scanning direction) on judgment area u$\phi$ which is a non-image recording area extended vertically at the center of a picture area in the case of a half size is detected, and then discrimination is made whether or not the detected pattern agrees with a reference pattern of a panorama size with which upper and lower non-image recording areas shown in FIG. 19 (a) are formed.

In this case, when the judgment area u$\phi$ extending vertically at the center of a picture area shows the pattern of density variation specific to a panorama size shown in FIG. 19 (a), the estimation for the occurrence of the noise mentioned above is assumed to be correct, and the sequence advances to step 14 to specify the picture size to be a panorama size.

On the other hand, in steps 19 and 20, when the picture size is confirmed not to be a panorama size even when printing of a date is taken into consideration, the sequence advances to step 21 for processing under the condition of unknown picture size. Incidentally, when the picture size is unknown, it is also possible to process under the condition that all picture sizes are a full size.

Incidentally, a portion of step 14 in FIG. 14 corresponds to a means for detecting density variation, a portion of step 12 corresponds to a means for binary-coding, and a portion of steps 13–21 corresponds to a means for judging picture sizes.

In detection of picture sizes shown in a flow chart in FIG. 14, there are used judgment areas t1, t2 and judgment area u$\phi$, however, either judgment areas t1 and t2 or judgment area u$\phi$ only may also be used as a judgment area.

Next, a flow of an editing work in the present film image editing apparatus will be explained as follows, referring to the flow charts in FIGS. 20-24 and display examples in FIGS. 25A through 31C. In FIGS. 25A through 31C, the section of "LCD" shows an image area of touch-panel 3 of a liquid crystal type, the section of "CRT1" shows an image area of first CRT4, and the section of "CRT2" shows an image area of second CRT5.

Figure 20:
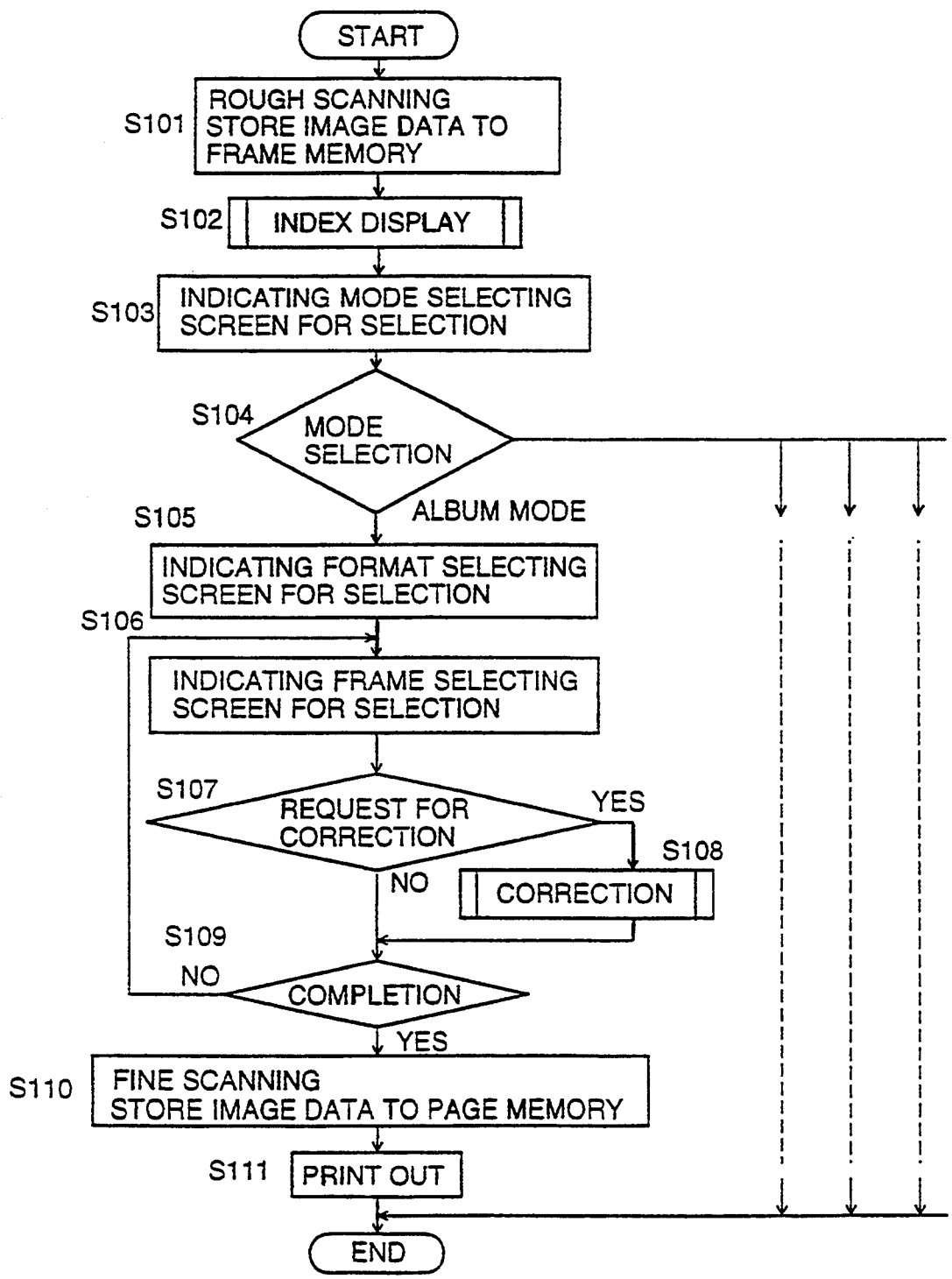
FIG. 20 is a flow chart showing the total flow of an editing work.

FIG. 20 is a flow chart showing the total flow of an editing work.

When the film image editing apparatus is started, the image area of the touch panel instructs to insert a cassette, and a start button operated after the insertion of the cassette starts the apparatus to read from the cassette (step 101 in FIG. 20).

In this case, a plurality of film holders 12 in the cassette 20 are transported in succession onto secondary scanning table 25, and all images of all frames from all film holders 12 are read roughly at high speed (rough scanning).

The rough scanning is repeated twice for each film holder 12, and the first half thereof is called pre-scanning, while the second half thereof is called index-scanning. Namely, image data are obtained through the prescanning at 8 times greater speed in the first half of the rough scanning, then, based on the image data thus obtained, correction data are prepared, and after that, image data are obtained through the index scanning at 8 times greater speed in the second half of the rough scanning while correcting with the correction data, and the image data thus obtained are stored in a frame memory.

In the manner mentioned above, images of the frames in the maximum number of 42 (6 frames×7 holders) are read and index-displayed on the first CRT as shown in FIG. 25 (step 102 in FIG. 20).

Figure 21:
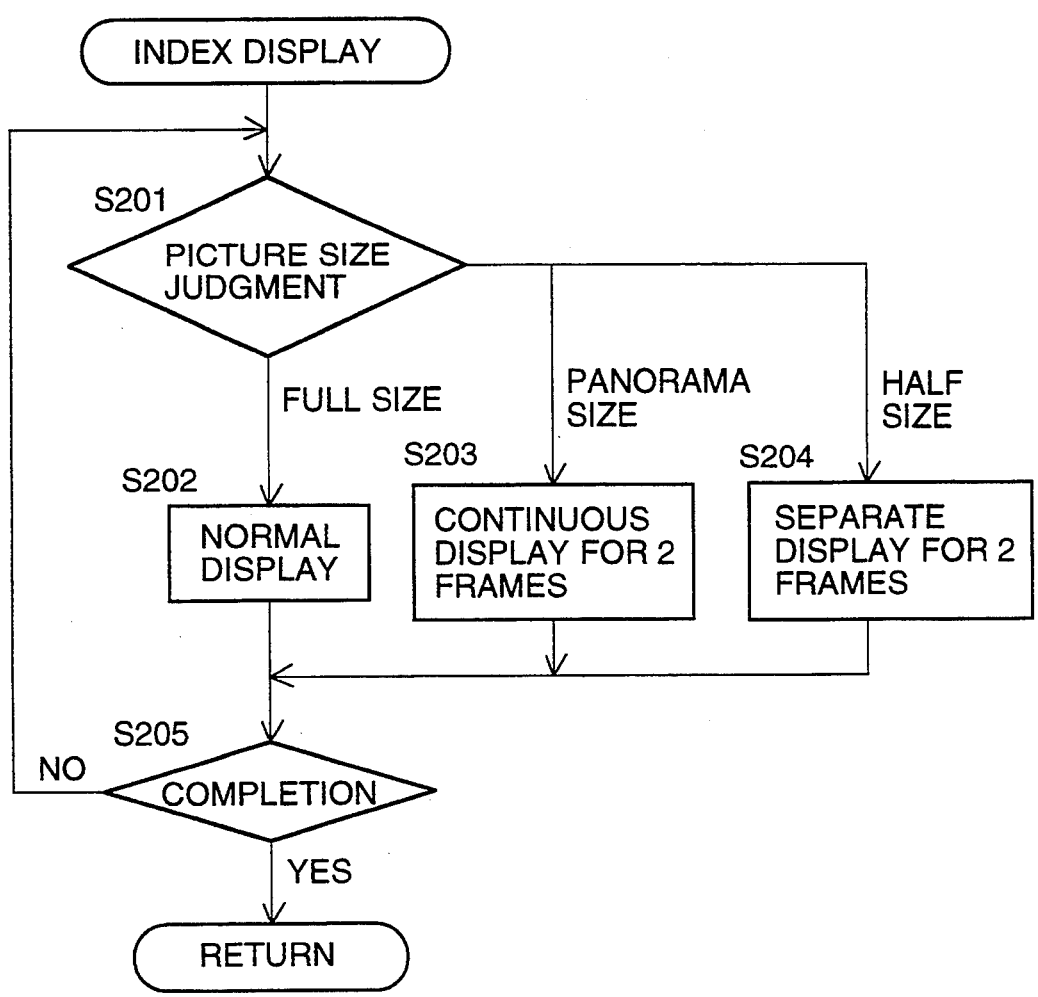
FIG. 21 is a flow chart of index-display.

Incidentally, index-display in step 102 in FIG. 20 is performed according to the flow chart in FIG. 21, and picture size of each frame is discriminated (step 201) based on the results of detection of picture sizes mentioned above. When the picture size is a full size, normal display is made for each frame (step 202), when it is a panorama size (low-aspect-ratio size), display is made successively on the space equivalent to two consecutive frames (step 203), and when it is a half size, a frame is divided into two and each divided one is tilted by 90 degrees for display (step 204). After completion of index-display for all frames, the sequence advances to return (step 25).

It is possible to input images also from reflection type originals in addition to photographic films.

After completion of index-display, mode-selection menus for index print (51), album (52), free layout (53), post card (54) and calendar (55) are displayed in icons together with their selection buttons as shown in FIG. 25 so that desired mode may be selected (step 103 in FIG. 20). Incidentally, the following explanation is on the assumption that an album mode is selected.

Figure 26C:
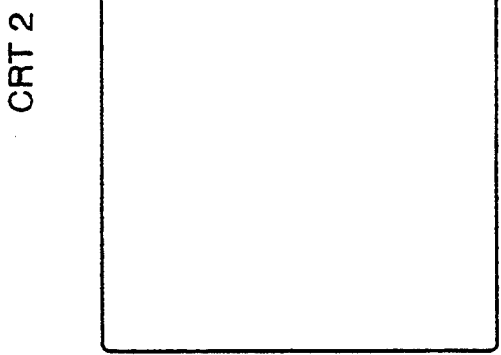
FIGS. 26A, 26B and 26C are diagrams showing display example 2 for a touch panel shown in FIG. 26A; an input CRT 1 shown in FIG. 26B; and an output CRT 2 shown in FIG. 26C.
Figure 26B:
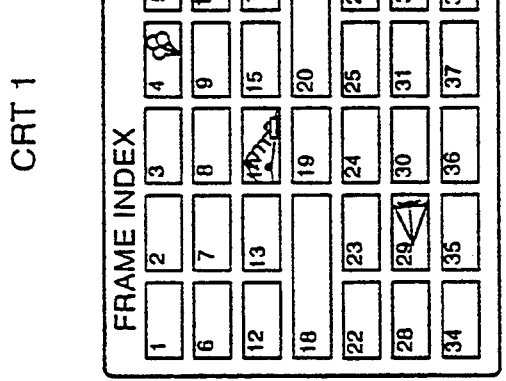
Figure 26A:
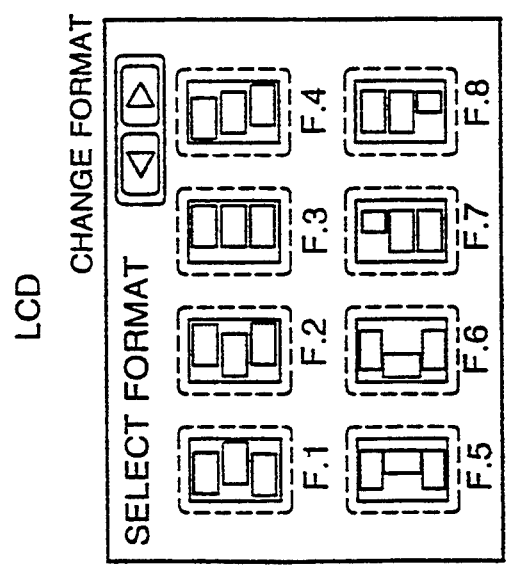

In the case of an album mode, a format (F.1-F.8) selection image area is displayed on the touch panel as shown in FIG. 26, for selection. (step 104→step 105 in FIG. 20).

After the format is selected, frame-selecting buttons 1-42 are displayed on the touch panel as shown in FIG. 27 as a frame selection screen, for selection (step 106 in FIG. 20).

After the frame is selected through operation of frame selection button (61) on the touch panel, the selected frame is subjected to framing (62) on the first CRT clarifying that the frame has been selected. In this case, the selected format is displayed on the second CRT, and when the frame is selected, the selected frame is written on the format of the second CRT.

On the frame selection screen, there are displayed frame selection buttons 1–42, correction button (63) and completion button (64). When the correction button (63) is pressed after selection of one frame, a correction mode screen is displayed on the touch panel as shown in FIG. 28, and the mode advances toward the correction mode (step 107→step 108 in FIG. 20). The correction in the correction mode is made according to flow charts in FIG. 22–FIG. 24, which will be explained later.

When the completion button (64) is pressed after selecting frames in predetermined quantity, layout editing is completed (step 109→step 110 in FIG. 20).

When album page editing is completed after layout editing and layout correction are completed in the way mentioned above, the selected frame is subjected to fine scanning to prepare image data for printing on a page memory. (step 110 in FIG. 20).

In this case, film holder 12 containing the frame selected from cassette 20 is transported onto secondary scanning table 25, and images on the frame that is in selection are read from the film holder 12 at the normal speed, thus, image data for printing are obtained. In the course of this reading, correction data obtained through the aforementioned pre-scanning and data for correction set in the correction mode which will be explained later are used.

After image data for printing use have been prepared on the page memory, the image data are sent to printer 7 for printing out (step 111 in FIG. 20).

Incidentally, in the flow chart in FIG. 20, a portion of step 101 corresponds to an image information reading means, a portion of step 102–step 110 corresponds to an editing means, and a portion of step 111 corresponds to an output means. Out of editing means of step 102–step 110, a portion of step 102 corresponds to an index display means, a portion of step 106 corresponds to a correction image selection means and an edition image selection means, a portion of step 107 and step 108 corresponds to a correction means, and a portion of steps 103, 104, 105, 109 and 110 corresponds to an editing means.

Next explanation is for a correction mode.

Figure 22:
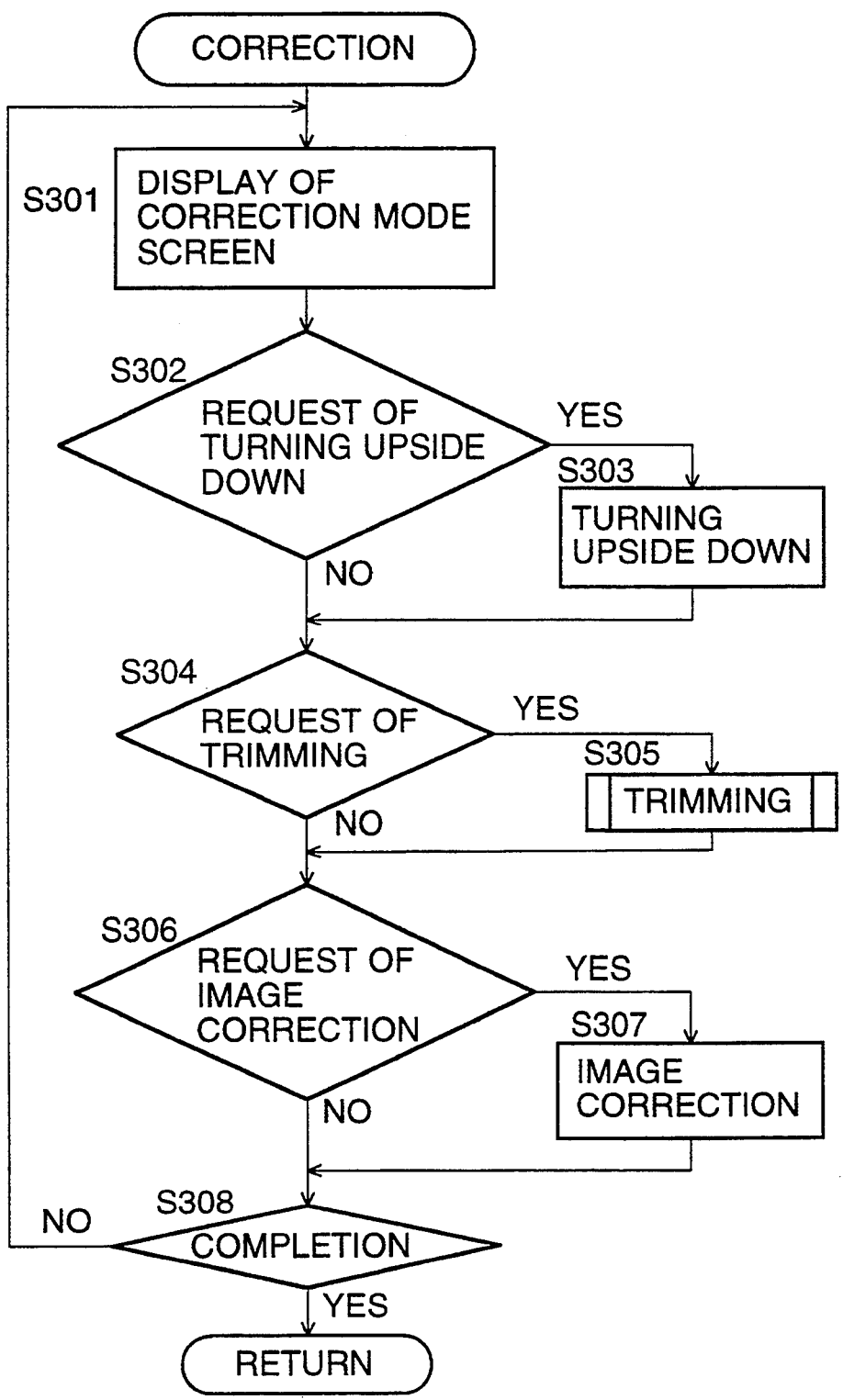
FIG. 22 is a flow chart of a correction mode.

FIG. 22 is a flow chart showing concrete contents of a correction mode (step 108 in FIG. 21).

Figure 28A:
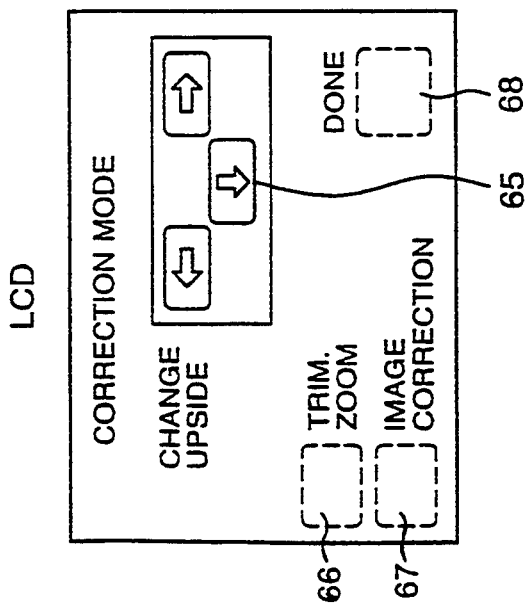
FIGS. 28A, 28B and 28C are diagrams showing display example 4 for a touch panel shown in FIG 28A; an input CRT 1 shown in FIG. 28B; and an output CRT 2 shown in FIG. 28C.
Figure 28B:
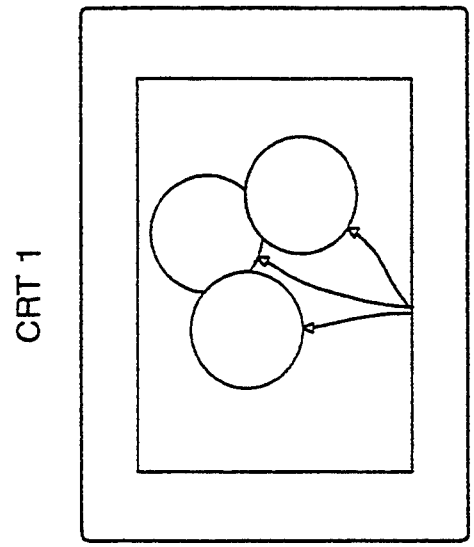

On a frame selection screen on the touch panel shown in FIG. 27A, when correction button (63) is pressed after selecting a frame by pressing either one of frame selecting buttons 1 - 42, a selection mode screen is displayed on the touch panel as shown in FIG. 28A (step 301 in FIG. 22). In this case, an original image (an image before correction) is displayed in an enlarged size on CRT1. Incidentally, on CRT2 is used for the purpose of indicating the corrected image in an enlarged size.

Figure 28C:
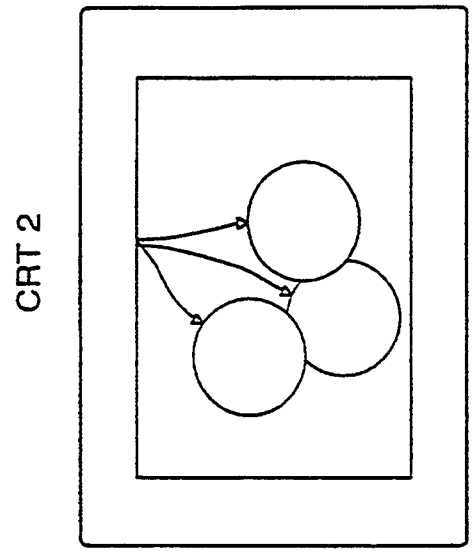

On the correction mode screen, as shown in FIGS. 28A, 27B and 28C, there are displayed turning upside down button (65), trimming button (6), image correction button (67) and completion button (68).

Therefore, when the turning upside down button (65) in FIG. 28A is operated, turning upside down is carried out (step 301→step 302 in FIG. 22). In this case, an image after correction is displayed on the second CRT (see FIG. 28C).

In addition, when trimming button (66) is operated, the mode advances to a trimming mode and trimming is carried out, for which the detailed explanation is omitted (step 304→step 305 in FIG. 22).

When the image correction button (67) is operated, the mode advances to an image correction mode which will be explained later and correction of images is carried out (step 306→step 307 in FIG. 22).

When the completion button (68) is operated after completion of the corrections mentioned above, the correction mode is completed and the sequence advances to the step of return (step 308 in FIG. 22).

Figure 23:
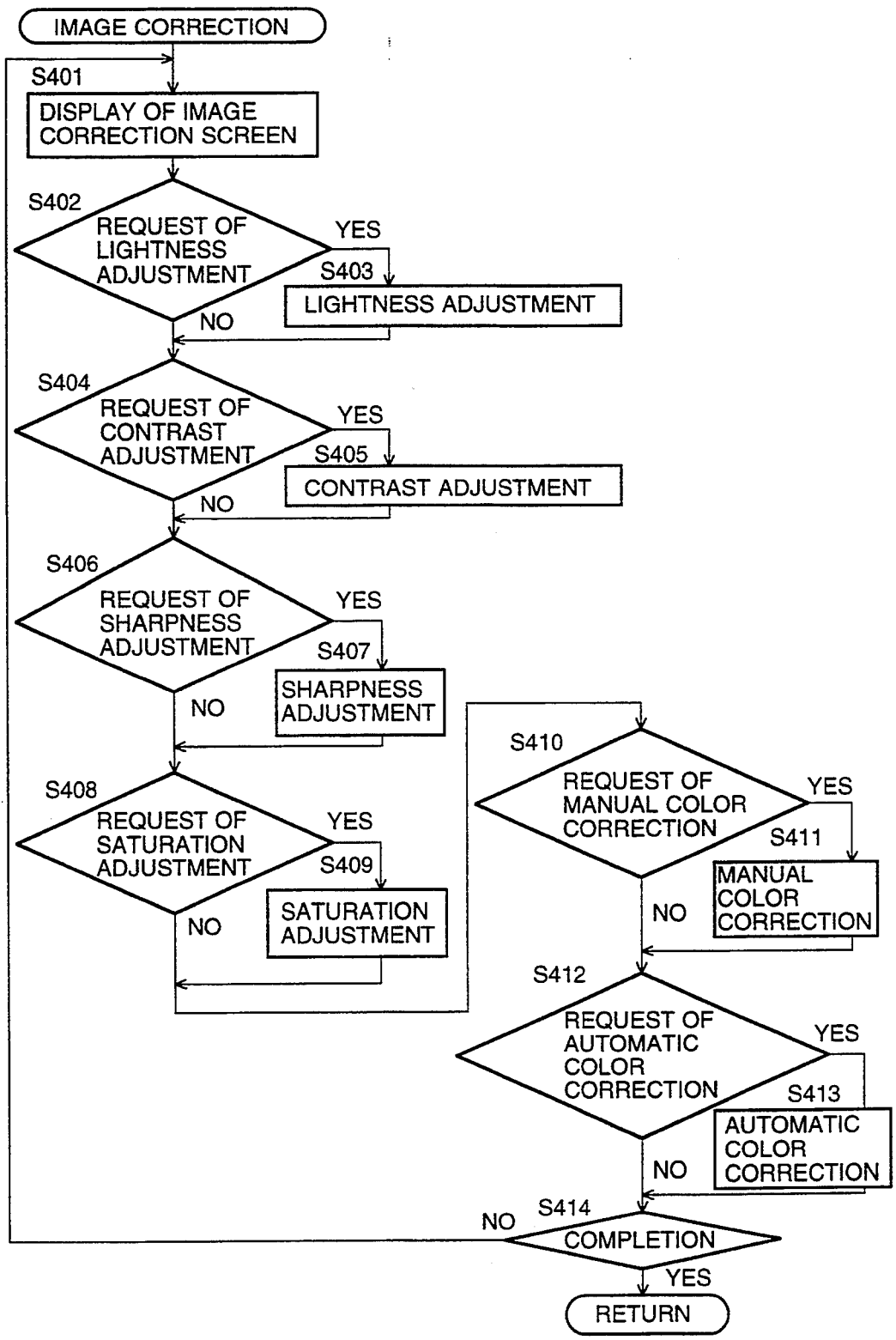
FIG. 23 is a flow chart of an image correction mode.

FIG. 23 represents a flow chart showing the concrete contents of the image correction mode (step 307 in FIG. 22).

When the image correction button (67) is pressed on the correction mode screen on the touch panel shown in Fig. 28, the correction mode screen is displayed on the touch panel as shown in FIG. 29 (step 401 in FIG. 23).

On the image correction mode screen, there are displayed lightness (brightness) adjusting button (69), contrast adjusting button (70), sharpness adjusting button (71), saturation adjusting button (72), manual color correction button (73), automatic color correction button (74) and completion button (75).

In the image correction mode, therefore, it is possible to correct images by adjusting the adjusting buttons (69–72) for lightness, contrast, sharpness and saturation on the touch panel (step 402→step 403, step 404→step 405, step 406→step 407, and step 408→step 409 in FIG. 23). In this case, an original image is indicated on the first CRT, while, an image after correction is indicated on the second CRT.

When the manual color correction button (73) is operated, the mode proceeds to a manual color correction mode (step 410→step 411 in FIG. 23).

Figure 29A:
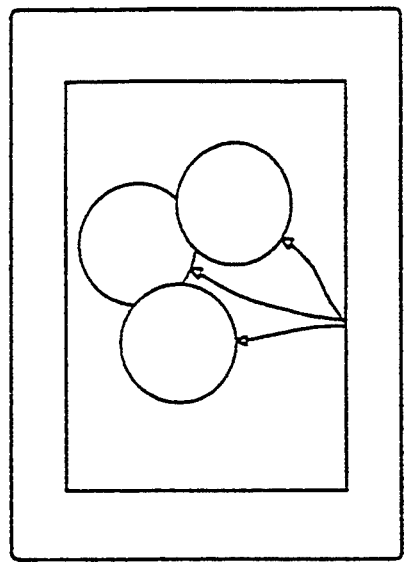
FIGS. 29A, 29B and 29C are diagrams showing display example 5 for a touch panel shown in FIG. 29A; an input CRT 1 shown in FIG. 29B; and an output CRT 2 shown in FIG. 29C.
Figure 29B:
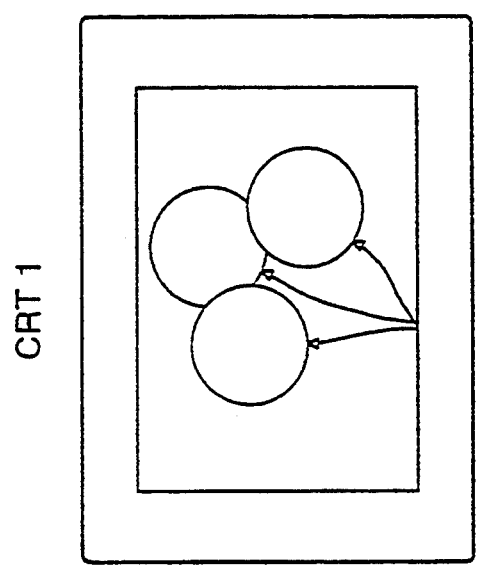
Figure 29C:
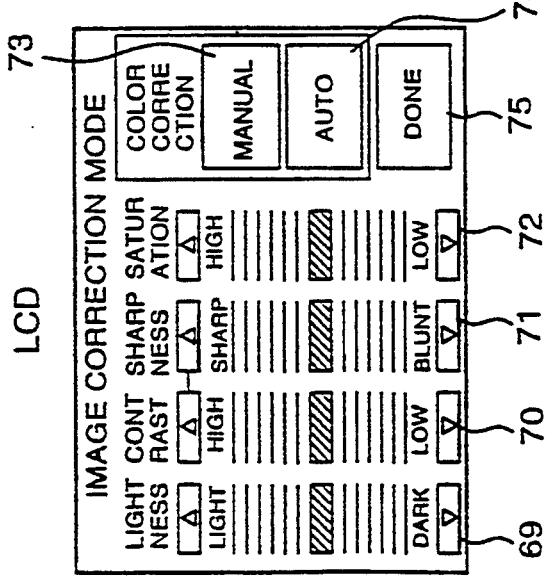
Figure 30C:
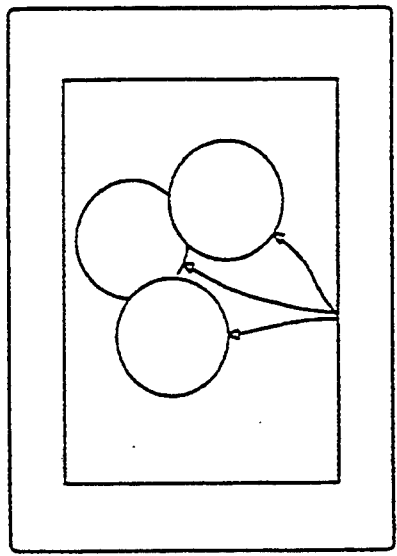
FIGS 30A, 30B and 30C are diagrams showing display example 6 for a touch panel shown in FIG. 30A; an input CRT 1 shown in FIG. 30B; and an output CRT 2 shown in FIG. 30C.
Figure 30B:
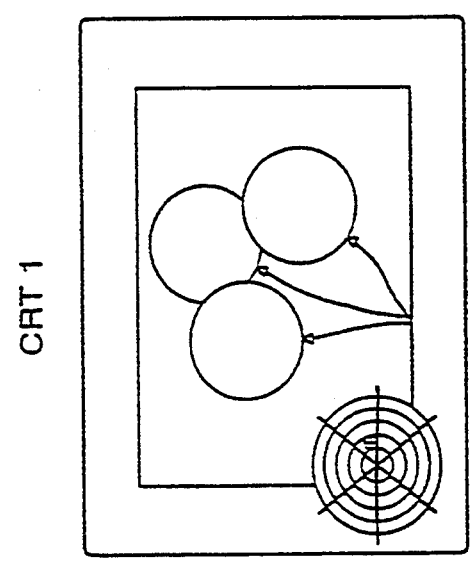
Figure 30A:
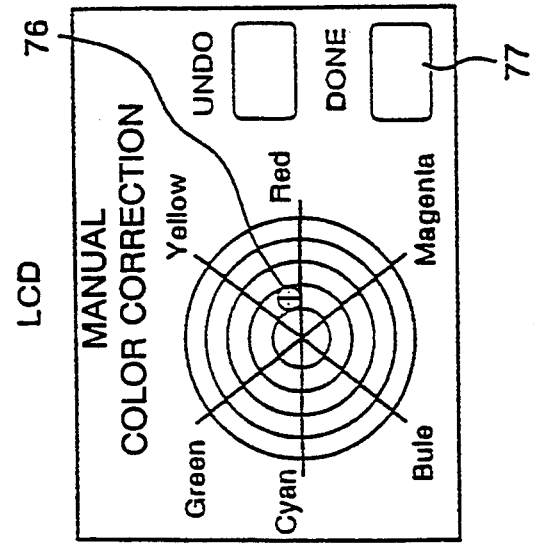

In the manual color correction mode, a manual color correction screen as shown in FIG. 30B is displayed. Namely, a color chart (red, yellow, green, cyan, blue and magenta) of a circular coordinate form is displayed on each of the touch panel and CRT1. In this case, when touching an appropriate position (for example, 76) on the touch panel, correction direction and correction amount are determined for color correction. Even in this case, an original image is shown on CRT1 and an image after correction is shown on CRT2. When completion button (77) is operated, the screen returns to image correction screen (FIGS. 29A, 29B and 29C).

When automatic color correction button (74) is operated, on the other hand, a mode is changed to an automatic color correction mode (step 412→step 413 in FIG. 23).

Figure 24:
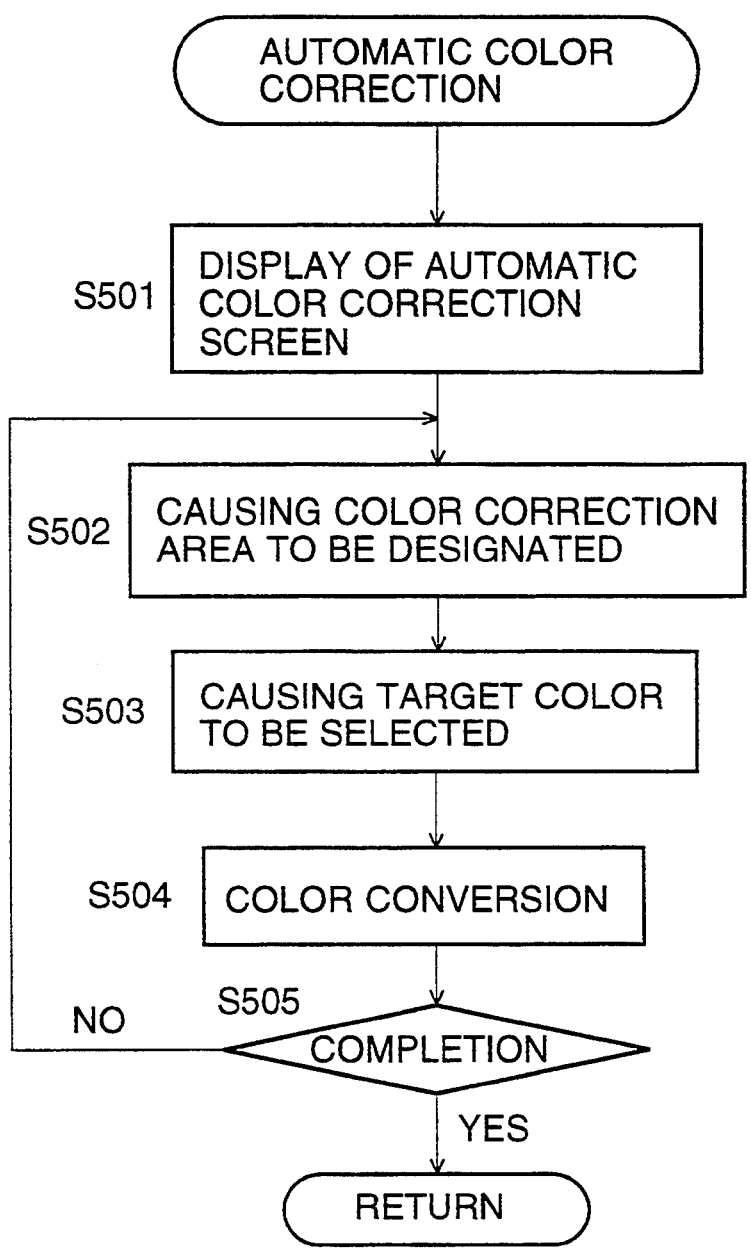
FIG. 24 is a flow chart of an automatic color correction mode.
Figure 31C:
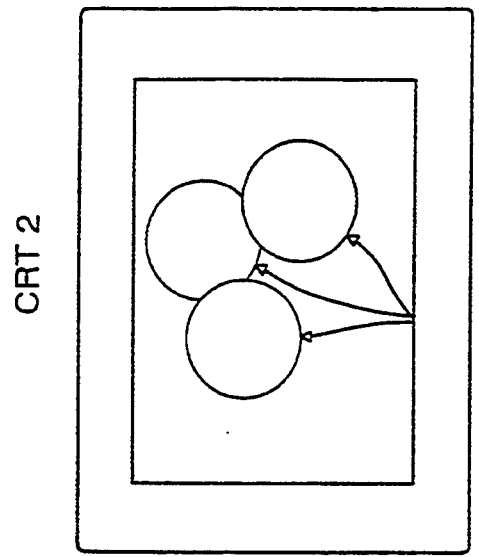
FIGS. 31AS, 31B and 31C are diagrams showing display example 7 for a touch panel shown in FIG. 31A; an input CRT 1 shown in FIG. 31B; and an output CRT 2 shown in FIG. 31C.
Figure 31B:
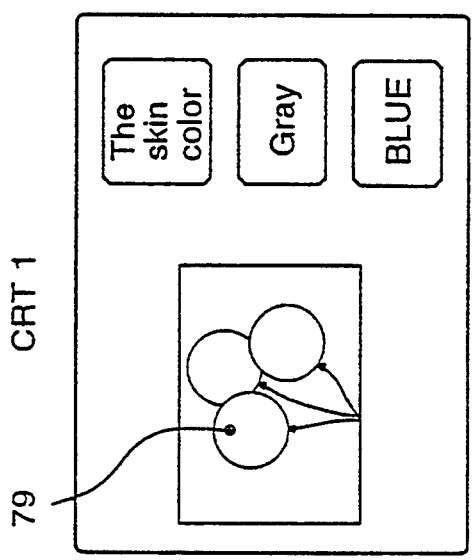
Figure 31A:
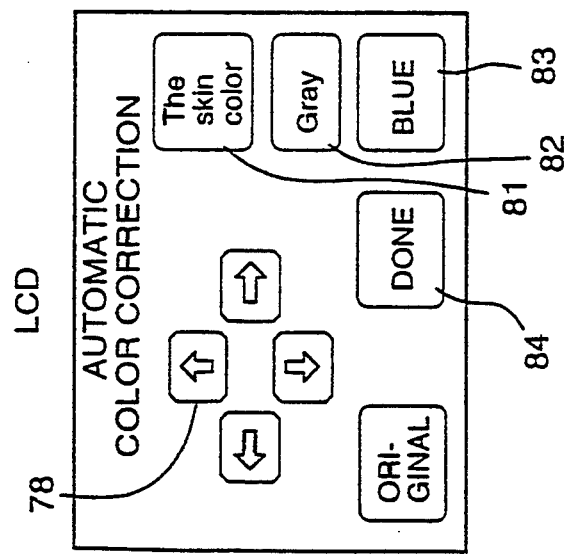

On the automatic color correction mode, an automatic color correction screen as shown in FIG. 31 is displayed as the concrete contents of step 413 in FIG. 23 are shown on a flow chart in FIG. 24 (step 501 in FIG. 24).

Within the automatic color correction screen, correction area designating button (78) is indicated on a touch panel, and target color selecting button such as, for example, target color selecting buttons (81–83) respectively for skin color, gray and blue are indicated according to a plurality of target colors established in advance.

Therefore, it is possible to designate an area for color correction on an original image by operating correction area designating button (78) in the appropriate direction and thereby moving cursor (79) on the first CRT, and it is possible to select target colors through the operation of touching on any of the target color selecting buttons (81–83) for skin color, gray and blue, thereby it is possible to change colors by adjusting to the target colors (steps 502, 503 and 504 in FIG. 24).

In this case, a portion of step 502 in FIG. 24 corresponds to a color correction area designating means, a portion of step 503 corresponds to a target color selecting means, and a portion of step 504 corresponds to a color changing means.

In this system, colors which are frequently desired to be used are established in advance as a target color, and a target color of skin color, for example, is selected when desiring to show the color of a human skin, and a target color of blue is selected when desiring to show the color of the sky. Thus, it is possible to correct colors through a simple operation by designating the portion to be changed to the target color on the screen.

Even in this case, an original image is indicated on the first CRT and the image after correction is indicated on the second CRT. Through an operation of completion button (84), a screen returns to image correction screen (FIG. 29A) (step 505 in FIG. 24).

After completion of these image corrections, an operation of completion button (75) brings an image correction mode to an end for returning. (step 414 in FIG. 23).

As stated above, the invention has an effect to make it possible to detect the picture size and to read each image correctly even from a developed photographic film wherein images of different sizes such as a full size, an oblong size (panorama size, low-aspect-ratio size) and a half size are mixed, thereby to edit them.

In addition, with an indicating means that index-displays a plurality of images before editing which is provided, an operator can observe the display, select and edit including correcting. Due to the editing which is done while viewing index-displayed images, the operation is easy and efficient. Thus, it is possible to obtain the results satisfying the intention of an operator.

In addition to the above, an image can be selected from a plurality of images before editing, and the selected image can simply be corrected and edited in terms of layout. With regard to color correction, in particular, correction to colors which are frequently desired to show can be done in a single operation, which means a remarkable improvement in practical use.

What is claimed is:

1. A film image editing apparatus for editing a plurality of different size photographic film images on a single roll of developed photographic film, comprising:
   image reading means for reading an image in a plurality of different picture size that exist in the developed roll of photographic film, including any two of at least a full size, a half-size, a panoramic size, and a low-aspect-ratio size image;
   a memory for storing a plurality of density variation reference data which, respectively, correspond to a respective one of a full size image, a half-size image, a panoramic size image, and a low-aspect-ratio size image;
   picture size detecting means for detecting a picture size of a selected one of said plurality of photographic film images in said developed roll of photographic film said picture size detecting means including:

density variation detecting means for detecting a density variation pattern of said selected one of said plurality of photographic film images aligned in a predetermined direction, wherein said density variation pattern represents a continuous density variation of a judgment area of said selected one of said plurality of photographic film images along a first length that corresponds to a length of said full size image as measured in one direction that is one of parallel and perpendicular to said predetermined direction; and a picture size determining means for determining said picture-size of said selected one of said plurality of photographic film images by comparing said density variation pattern with said plurality of density variation reference data stored in said memory means so as to identify said picture-size of said selected one of said plurality of photographic film images;

editing means for editing said selected one of said plurality of photographic film images in said picture size according to an input operation by an operator; and output means for outputting said selected one of said images edited by said editing means.

2. The apparatus of claim 1, wherein said image reading means comprises:

film reading means for reading said selected one of said plurality of photographic film images from said developed photographic film by scanning said developed photographic film with a line sensor which is moved in a secondary scanning direction while said line sensor scans in a primary scanning direction.

3. The apparatus of claim 1, wherein said density variation detecting means detects said density variation pattern of said selected one of said plurality of photographic film images at a judgment area corresponding to a nonimage recording area of a low-aspect-ratio size image when said image reading means reads an image in a secondary scanning direction.

4. The apparatus of claim 3, wherein said density variation detecting means includes:

binary coding means for coding said selected one of said plurality of photographic film images, which is read by said image reading means, into a binary data; and pattern detecting means for detecting said density variation pattern based on said binary data.

5. The apparatus of claim 1, wherein said density variation detecting means detects said density variation pattern of said selected one of said plurality of photographic film images at a judgment area corresponding to an area created between two adjacent half-size images in a primary scanning direction which is a perpendicular to said predetermined direction.

6. The apparatus of claim 5, wherein said density variation detecting means includes:

binary coding means for coding said selected one of said plurality of photographic film images, which is read by said image reading means, into a binary data; and pattern detecting means for detecting said density variation pattern based on said binary data.

7. The apparatus of claim 1, wherein said editing means includes:

a display means for displaying said image in said picture size with an index.

8. The apparatus of claim 1, wherein said editing means includes:

a selecting means for selecting one of a plurality of ones of said image in said picture size by said operator so as to edit said one of said plurality of ones of said image in said picture size.

9. The apparatus of claim 8, wherein said editing means further includes:

arranging means for arranging a layout of a plurality of selected ones of said plurality of photographic film images in one of said picture sizes.

10. The apparatus of claim 8, wherein said selecting means includes:

a cassette means for accommodating a plurality of film holders, each of said film holders holding a plurality of independent positive film frames.

11. The apparatus of claim 8, wherein said selecting means includes:

a cassette means for accommodating a plurality of film holders, each of said film holders holding a film strip including a plurality of continuous negative film frames.

12. The apparatus of claim 1, wherein said editing means includes:

area designating means for designating a color correction area in said selected one of said plurality of photographic film images;

target color selecting means for selecting one of a plurality of predetermined target colors to correct at least one color of said color correction area; and color correction means for correcting said selected one of said plurality of predetermined target colors of said color correction area to be a selected one of said plurality of predetermined target colors.

13. The apparatus of claim 1, wherein said density variation detecting means detects said density variation pattern of said selected one of said plurality of photographic film images at a judgment area that corresponds to a non-image recording area of a panoramic size image when said image reading means reads an image in a secondary scanning direction which is parallel to said predetermined direction.

14. A film image editing apparatus for editing a plurality of different size photographic film images on a single roll of developed photographic film, comprising:

image reading means for reading an image in any one of a plurality of different picture sizes that exist in the developed roll of photographic film, including a full size image a half-size image, a panoramic size image, and a low-aspect-ratio size image;

picture size detecting means for detecting a picture size of a selected one of said plurality of photographic film images in said developed roll of photographic film;

said picture size detecting means including:

density variation detecting means for detecting a density variation pattern of said selected one of said plurality of photographic film images aligned in a predetermined direction, wherein said density variation pattern represents a continuous density variation of a judgment area corresponding to a non-image recording area of a low-aspect-ratio size image when said image reading means reads an image in a secondary scanning direction; and a picture size determining means for determining said picture-size of said selected one of said plurality of photographic film images by comparing said density variation pattern with a plurality of stored density variation reference data so as to identify said picture-size of said selected one of said plurality of photographic film images;

editing means for editing said selected one of said plurality of photographic film images in said picture size according to an input operation by an operator; and output means for outputting said selected one of said images edited by said editing means.

15. A film image editing apparatus for editing a plurality of different size photographic film images on a single roll of developed photographic film, comprising:

image reading means for reading an image in any one of a plurality of different picture sizes that existing the developed roll of photographic film, including a full size image, a half-size image, a panoramic size image, a low-aspect-ratio size image;

picture size detecting means for detecting a picture size of a selected one of said plurality of photographic film images in said developed roll of photographic film;

said picture size detecting means including:

density variation detecting means for detecting a density variation pattern of said selected one of said plurality of photographic film images aligned in a predetermined direction, wherein said density variation pattern represents a continuous density variation of a judgment area corresponding to an area created between two adjacent half-size images in a primary scanning direction; and a picture size determining means for determining said picture-size of said selected one of said plurality of photographic film images by comparing said density variation pattern with a plurality of stored density variation reference data so as to identify said picture-size of said selected one of said plurality of photographic film images;

editing means for editing said selected one of said plurality of photographic film images in said picture size according to an input operation by an operator; and output means for outputting said selected one of said images edited by said editing means.

* * * * *